US011369061B2

(12) United States Patent
Kulkarni et al.

(10) Patent No.: US 11,369,061 B2
(45) Date of Patent: Jun. 28, 2022

(54) AGRICULTURAL BALER WITH MECHANISMS FOR PRODUCING CROP BALES

(71) Applicant: DEERE & COMPANY, Moline, IL (US)

(72) Inventors: Nikhil Kulkarni, Pune (IN); Darin L. Roth, Batavia, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 577 days.

(21) Appl. No.: 16/018,757

(22) Filed: Jun. 26, 2018

(65) Prior Publication Data

US 2019/0387683 A1    Dec. 26, 2019

(51) Int. Cl.
| | |
|---|---|
| *A01F 15/04* | (2006.01) |
| *A01F 15/08* | (2006.01) |
| *B30B 1/06* | (2006.01) |
| *F15B 15/06* | (2006.01) |
| *F16H 21/44* | (2006.01) |

(52) U.S. Cl.
CPC ........ *A01F 15/042* (2013.01); *A01F 15/0841* (2013.01); *B30B 1/06* (2013.01); *F15B 15/06* (2013.01); *F16H 21/44* (2013.01)

(58) Field of Classification Search
CPC .... A01F 15/042; A01F 15/0841; F15B 15/06; F16H 21/44; B30B 1/02; B30B 1/06; B30B 9/306; B30B 9/3021; B30B 1/26; B30B 1/266; B30B 1/14
USPC ........................................ 100/179, 282, 283
See application file for complete search history.

(56) References Cited

U.S. PATENT DOCUMENTS

| | | | |
|---|---|---|---|
| 1,513,573 | A * | 10/1924 | Alexander .............. A01F 15/06 100/142 |
| 2,687,688 | A * | 8/1954 | Morrison |
| 5,950,410 | A | 9/1999 | O'Brien et al. |
| 6,622,468 | B2 | 9/2003 | Lucand et al. |
| 6,640,699 | B2 | 11/2003 | Viaud |
| 7,694,504 | B1 | 4/2010 | Viaud et al. |
| 8,069,781 | B2 | 12/2011 | Lang |

(Continued)

FOREIGN PATENT DOCUMENTS

| | | |
|---|---|---|
| EP | 0819374 A1 | 1/1998 |
| EP | 0876752 A1 | 11/1998 |
| EP | 3308636 A1 | 4/2018 |

OTHER PUBLICATIONS

European Search Repod issued in counterpart European Patent Application No. 19180046.5 dated Mar. 25, 2020 (8 pages).

*Primary Examiner* — Jimmy T Nguyen
(74) *Attorney, Agent, or Firm* — Taft Stettinius & Hollister LLP; Stephen F. Rost

(57) ABSTRACT

Agricultural harvesting machines and methods of operation thereof are disclosed herein. A harvesting machine includes a main frame, a drive mechanism, a plunger, and a linkage system. The drive mechanism is coupled to the main frame and has at least one crank arm that is rotatable about a crank arm axis. The plunger is movable along a longitudinal axis in a compression chamber between a de-stroked position and a stroked position that is located rearward of the de-stroked position along the longitudinal axis. The linkage system couples the plunger to the main frame.

20 Claims, 17 Drawing Sheets

(56) References Cited

U.S. PATENT DOCUMENTS

| | | | |
|---|---|---|---|
| 2003/0029148 A1* | 2/2003 | Chont | A01F 15/042 56/8 |
| 2003/0159421 A1 | 8/2003 | Trelstad et al. | |
| 2005/0056165 A1* | 3/2005 | Roth | |
| 2013/0047867 A1* | 2/2013 | Van De Laarschot | A01F 15/042 100/7 |
| 2014/0165859 A1 | 6/2014 | O'Reilly et al. | |
| 2014/0290198 A1* | 10/2014 | Dillon | |
| 2014/0305322 A1* | 10/2014 | Galant | A01F 15/046 100/35 |
| 2015/0208586 A1 | 7/2015 | Lang et al. | |
| 2016/0165804 A1* | 6/2016 | Tack | A01F 15/042 56/341 |
| 2018/0098500 A1 | 4/2018 | Kraus | |
| 2018/0098501 A1 | 4/2018 | Kraus | |
| 2018/0098502 A1 | 4/2018 | Kraus | |
| 2018/0098504 A1 | 4/2018 | Kraus | |
| 2018/0098505 A1 | 4/2018 | Kraus | |
| 2018/0098506 A1 | 4/2018 | Kraus | |
| 2018/0098507 A1 | 4/2018 | Kraus | |
| 2018/0098508 A1 | 4/2018 | Kraus | |

\* cited by examiner

AGRICULTURAL BALER WITH MECHANISMS FOR PRODUCING CROP BALES

FIELD OF THE DISCLOSURE

The present disclosure relates, generally, to a work machine for harvesting crops, and, more particularly, to a harvesting machine for producing crop bales.

BACKGROUND

Agricultural balers may be used to gather, compress, and shape crop material into bales, thereby producing crop bales. One such baler, which is sometimes referred to as a square baler, may be used to produce bales having a rectangular and/or square shape. Square balers may utilize a compression system that includes an input component driven by a source of rotational power. The compression system may include an output component driven by the input component through one or more intermediate components, and the output component may interact with crop material contained in a chamber to compress and densify the crop material.

A large amount of torque may be required to initiate operation of various components used to provide rotational power to the compression system, and to initiate operation of the compression system components. In some cases, that amount of torque may be due to inertia associated with heavy components of balers. Alternatively and/or additionally, resistance to movement of components of the compression system caused by crop material (e.g., crop material contained in the chamber) may dictate that amount of torque. Some baler components (e.g., the input component(s) of the compression system) may experience relatively high loads during operation of the baler. Performance of other balers may be associated with a somewhat limited throughput. Other balers still may compress and densify crop material to a somewhat limited degree.

SUMMARY

The present disclosure may comprise one or more of the following features and combinations thereof.

According to one aspect of the present disclosure, a harvesting machine may include a main frame, a drive mechanism, a plunger, a linkage system, and at least one link. The drive mechanism may be coupled to the main frame, and the drive mechanism may have at least one crank arm that is rotatable about a crank arm axis. The plunger may be movable along a longitudinal axis in a compression chamber between a de-stroked position and a stroked position that is located rearward of the de-stroked position along the longitudinal axis. The linkage system may couple the plunger to the main frame. The at least one link may couple the linkage system to the at least one crank arm. A position of the plunger along the longitudinal axis may be controlled at least in part by the linkage system. A position of the linkage system may be controlled by at least one of a position of the at least one crank arm about the crank arm axis and a length of the at least one link.

In some embodiments, the at least one link may have a fixed length such that the position of the linkage system is controlled by the position of the at least one crank arm about the crank arm axis. The linkage system may include a first linkage having a rocker arm pivotally coupled to the main frame and a connecting link pivotally coupled to the rocker arm that is configured to interface with the plunger. The at least one link may be pivotally coupled to the at least one crank arm and to at least one of the rocker arm and the connecting link of the first linkage. The linkage system may include a second linkage having a second rocker arm coupled to the first rocker arm and pivotally coupled to the main frame and a second connecting link pivotally coupled to the second rocker arm that is configured to interface with the plunger. The at least one link may include a first link and a second link, and the at least one crank arm may include a first crank arm and a second crank arm. The first link may be pivotally coupled to the first crank arm and to each of the rocker arm and the connecting link of the first linkage, and the second link may be pivotally coupled to the second crank arm and to each of the second rocker arm and the second connecting link of the second linkage.

In some embodiments, the at least one link may include a first actuator having a variable length, and the position of the linkage system may be controlled by the position of the at least one crank arm about the crank arm axis and the variable length of the first actuator. The linkage system may include a first linkage having a rocker arm pivotally coupled to the main frame and a connecting link pivotally coupled to the rocker arm that is configured to interface with the plunger. The at least one link may be pivotally coupled to the at least one crank arm and to at least one of the rocker arm and the connecting link of the first linkage. The linkage system may include a second linkage having a second rocker arm coupled to the first rocker arm and pivotally coupled to the main frame and a second connecting link pivotally coupled to the second rocker arm that is configured to interface with the plunger. The at least one link may include a second actuator having a variable length, and the position of the linkage system may be controlled by the position of the at least one crank arm about the crank arm axis and the variable length of the second actuator. The at least one crank arm may include a first crank arm and a second crank arm, the first actuator may be pivotally coupled to the first crank arm and to each of the rocker arm and the connecting link of the first linkage, and the second actuator may be pivotally coupled to the second crank arm and to each of the second rocker arm and the second connecting link of the second linkage.

According to another aspect of the present disclosure, a harvesting machine may include a main frame, a drive mechanism, a plunger, and a linkage system. The drive mechanism may be coupled to the main frame, and the drive mechanism may have at least one crank arm that is rotatable about a crank arm axis. The plunger may be movable along a longitudinal axis in a compression chamber between a de-stroked position and a stroked position that is located rearward of the de-stroked position along the longitudinal axis. The linkage system may couple the plunger to the main frame and be coupled to the at least one crank arm. A position of the plunger along the longitudinal axis may be controlled at least in part by the linkage system. A position of the linkage system may be controlled by a position of the at least one crank arm about the crank arm axis.

In some embodiments, the linkage system may include a first linkage having a control arm pivotally coupled to the main frame and a connecting link pivotally coupled to the control arm that is configured to interface with the plunger. The first linkage may include a control coupler to couple the at least one crank arm to the control arm, and the control coupler may be movable in a slot formed in the control arm in response to rotation of the at least one crank arm about the crank arm axis. The linkage system may include a second linkage having a second control arm pivotally coupled to the main frame and a second connecting link pivotally coupled to the second control arm that is configured to interface with the plunger. The at least one crank arm may include a first crank arm and a second crank arm, the first crank arm may be coupled to the control arm of the first linkage by the control coupler of the first linkage, and the second crank arm may be coupled to the second control arm of the second linkage by a second control coupler of the second linkage. The second control coupler may be movable in a slot formed in the second control arm in response to rotation of the second crank arm about the crank arm axis.

According to yet another aspect of the present disclosure, a harvesting machine may include a main frame, a drive mechanism, a plunger, a linkage system, and at least one link. The drive mechanism may be coupled to the main frame, and the drive mechanism may have at least one crank arm that is rotatable about a crank arm axis. The plunger may be movable along a longitudinal axis in a compression chamber between a de-stroked position and a stroked position that is located rearward of the de-stroked position along the longitudinal axis. The linkage system may couple the plunger to the main frame. The at least one link may couple the linkage system to the at least one crank arm, and the at least one link may have a variable length. A position of the plunger along the longitudinal axis may be controlled at least in part by the linkage system. A position of the linkage system may be controlled by a position of the at least one crank arm about the crank arm axis and the variable length of the at least one link.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
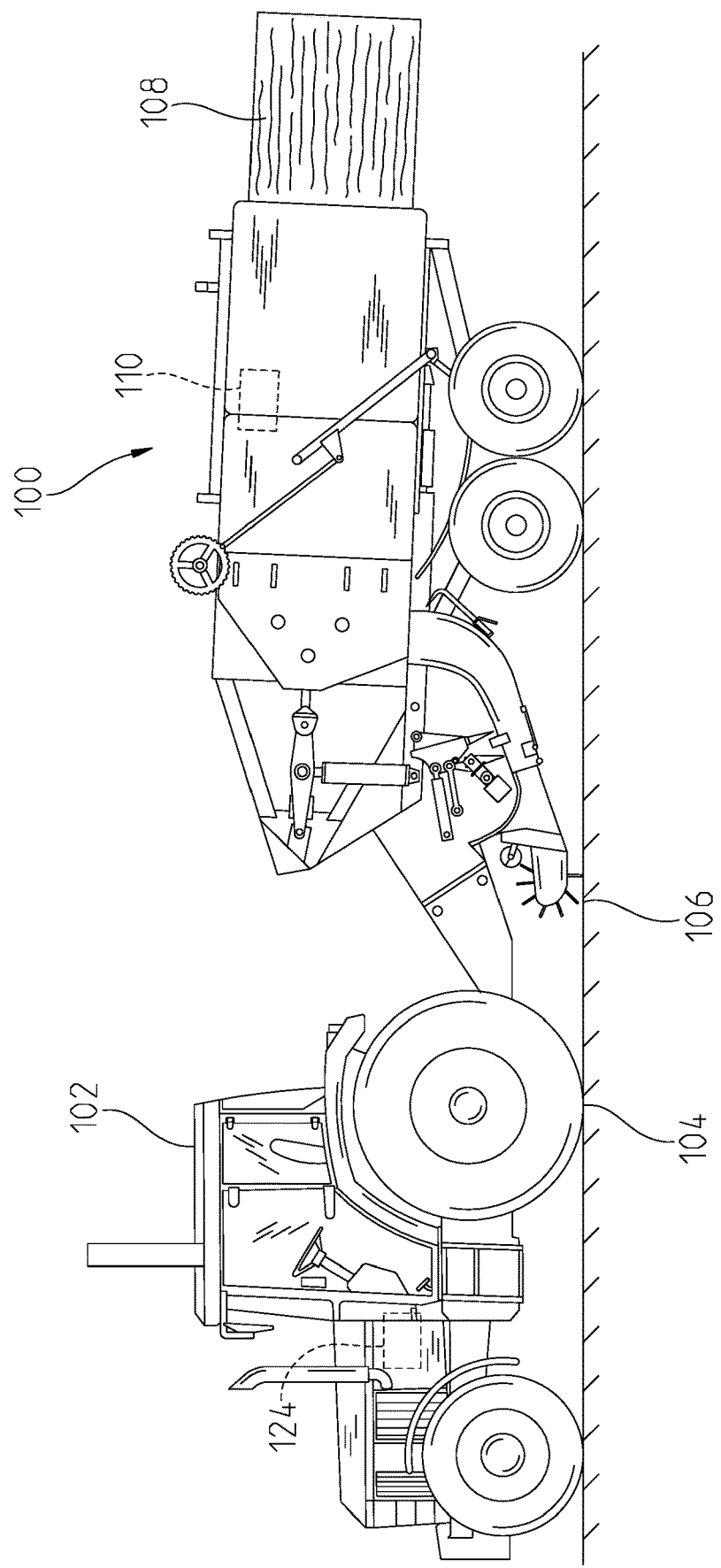
FIG. 1 is a perspective view of an agricultural harvesting machine coupled to an agricultural vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative agricultural harvesting machine 100 is coupled to an agricultural vehicle 102 such as a tractor, for example. In the illustrative embodiment, the harvesting machine 100 is embodied as, or otherwise includes, a large square baler. Of course, in other embodiments, it should be appreciated that the harvesting machine 100 may be embodied as, or otherwise include, another suitable baler or harvesting machine. In such embodiments, as well as in the illustrative embodiment, the harvesting machine 100 may be combined or integrated with a cotton harvester or a combine, among other harvesting machines. The harvesting machine 100 may be towed and/or propelled by the agricultural vehicle 102. Alternatively, the harvesting machine 100 may be self-propelled. In any case, the harvesting machine is capable of traversing a field 104, gathering crop material 106 from the field 104, and processing the crop material 106 to form crop packages 108, each of which is illustratively embodied as, or otherwise includes, bales. Crop packages 108 formed by the harvesting machine 100 are ejected from the rear thereof.

In the illustrative embodiment, the harvesting machine 100 (or the agricultural vehicle 102) includes one or more computing devices, such as one or more controllers 110. Although each controller 110 is depicted in FIG. 1 as being mounted on the harvesting machine 100, it should be appreciated that each controller 110 may be mounted on various other locations, such as on the vehicle 102, or elsewhere. The one or more controllers 110 are described in greater detail below with reference to FIG. 17.

Figure 2:
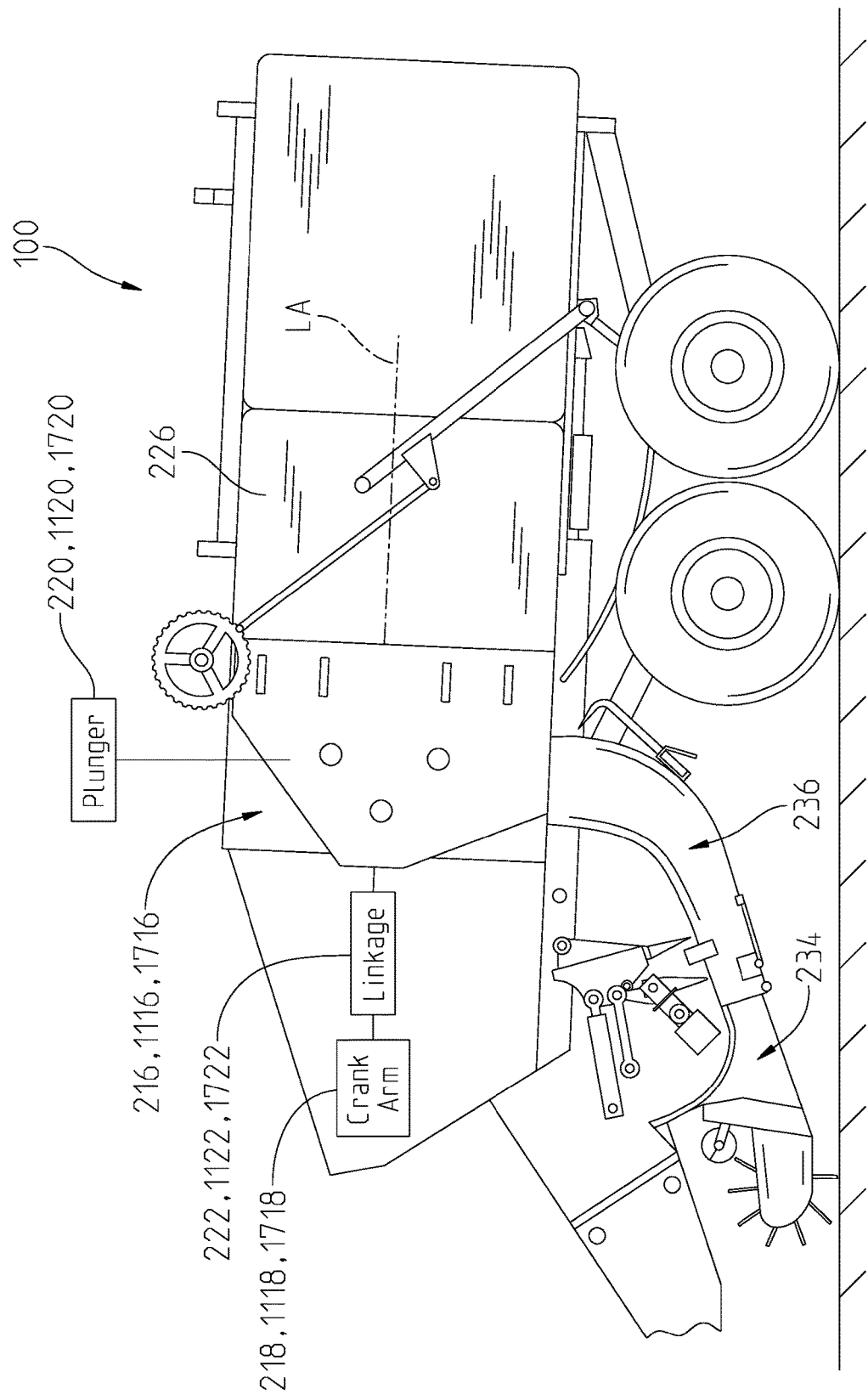
FIG. 2 is a partially diagrammatic side view of an agricultural harvesting machine that includes a compression system.

Referring now to FIG. 2, the illustrative harvesting machine 100 includes at least one compression system 216, 1116, 1716 that is capable of compressing crop material 106 into one or more crop packages 108. Beginning with the illustrative compression system 216 (the compression systems 1116, 1716 are described in detail below), the system 216 includes a crank arm 218, a plunger 220, and a linkage 222, which are further described below.

Figure 6:
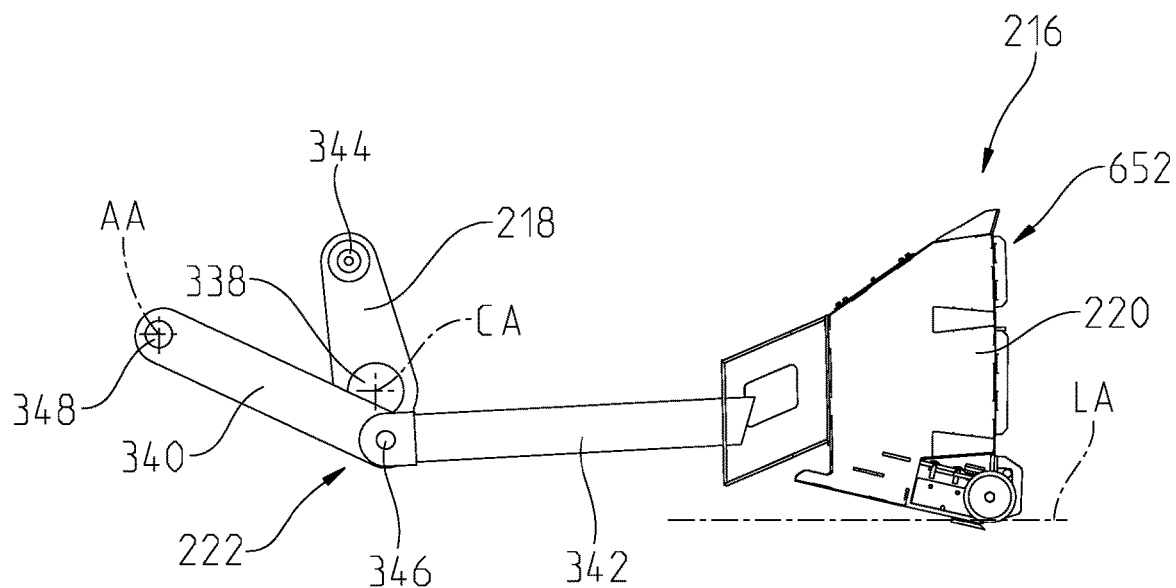
FIG. 6 is a side view of the compression system of FIG. 3 in another operational state that is intermediate commencement and completion of the operating cycle of the plunger.

The illustrative crank arm 218 is rotatable about a crank arm axis CA in response to rotational power provided to the crank arm 218 by a rotational power source, such as a drive unit (e.g., a motor, engine, or prime mover) 124 (see FIG. 1) that is capable of propelling the agricultural vehicle 100 and/or the harvesting vehicle 102, for example. The illustrative plunger 220 is coupled to the crank arm 218 and movable along a longitudinal axis LA in a compression chamber 226 of the harvesting machine 100 in response to rotation of the crank arm 218 about the crank arm axis CA to compress crop material 106. More specifically, as further discussed below, the plunger 220 is capable of back-and-forth linear movement (or reciprocal motion) along the axis LA between a de-stroked position 450 (shown in FIG. 4) and a stroked position 652 (shown in FIG. 6) that is located rearward of the de-stroked position 450 along the axis LA. The illustrative linkage 222, which may also be referred to as a drive assembly, is coupled between the plunger 220 and the crank arm 218 to convert rotation of the crank arm 218 into movement of the plunger 220. That is, the linkage 222 is configured to drive movement of the plunger 220 from the de-stroked position 450 to the stroked position 652 in response to rotation RW (see FIG. 9) of the crank arm 218 about the axis CA, and from the stroked position 652 to the de-stroked position 450 in response to rotation RR (see FIG.

10) of the crank arm 218 about the axis CA. As described in greater detail below, rotation RW corresponds to an angular displacement DW that is greater than an angular displacement DR corresponding to rotation RR.

As used hereafter, one working or compression stroke of the compression system 216 is associated with, or otherwise corresponds to, movement of the plunger 220 from the de-stroked position 450 to the stroked position 652. Conversely, one return stroke of the compression system 216 is associated with, or otherwise corresponds to, movement of the plunger 220 from the stroked position 652 to the de-stroked position 450. The return stroke of the plunger 220 may be completed in less time than the working stroke during a single operating cycle of the compression system 216. As a consequence, compared to other configurations with different operating cycles, the compression system 216 may allow more crop material 106 to be added into the chamber 226 during operation, which may facilitate increased throughput (or bale production capacity) of the harvesting machine 100. Compared to compression systems incorporating mechanisms different from the linkage 222, loads experienced by components of the compression system 216 (e.g., torque loads experienced by the crank arm 218 and/or components of the linkage 222) may be decreased, thereby extending component useful life. Even more, compared to other configurations with different operating cycles and mechanisms different from the linkage 222, the compression system 216 may deform, compress, and/or densify crop material 106 to a greater degree in operation.

Rotational power from a power source (e.g., the drive unit 124) may be provided to the harvesting machine 100 by a power-takeoff (PTO) shaft (not shown) that is coupled to the power source. The PTO shaft may be coupled to the harvesting machine 100 or integrated therewith. In some embodiments, a transmission (not shown) may be coupled to the PTO shaft, and a flywheel (not shown) may be coupled between the PTO shaft and the transmission. The transmission may be coupled to the crank arm 218 such that rotational power may be input to the compression system 216 (i.e., via the crank arm 218) through one or more of the PTO shaft, the transmission, and the flywheel. In some embodiments, the transmission may include one or more gearboxes or gearsets which convert rotational motion of the PTO shaft about one axis to rotational motion about another generally transverse axis (e.g., the crank arm axis CA). Additionally, in some embodiments, each gearbox or gearset may be powered by an electrical or hydraulic machine, rather than by rotational power provided via a PTO interface.

In some embodiments, the harvesting machine 100 may include one or more mechanisms that cooperate to introduce crop material 106 into the chamber 226. For example, the harvesting machine 100 may include a pick-up mechanism 234 that is configured to gather crop material 106 from the ground and feed it toward the compression system 216, as well as a loading mechanism 236 that is configured to move crop material 106 output by the pick-up mechanism 234 into the compression chamber 226. The pick-up mechanism 234 may include devices such as tines, forks, augers, conveyors, baffles, cutters, pre-cutter assemblies, the like, or any combination thereof. The loading mechanism 236 may include devices such as projections, tines, forks, knives, the like, or any combination thereof.

Figure 3:
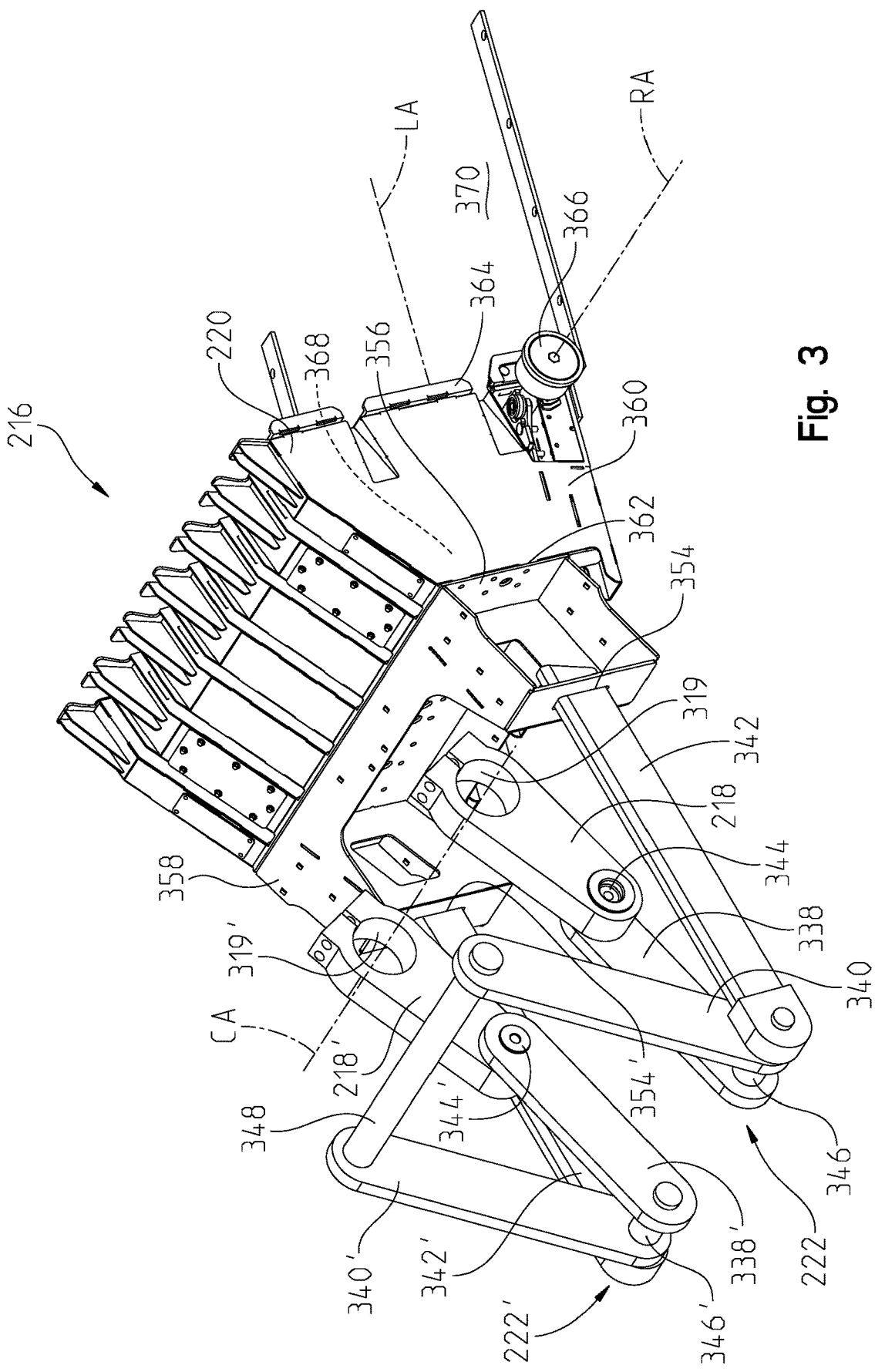
FIG. 3 is a perspective view of one embodiment of the compression system depicted in FIG. 2.

Referring now to FIG. 3, the compression system 216 is depicted in detail with certain elements of the harvesting machine 100 omitted for the sake of simplicity and clarity. In the illustrative embodiment, the linkage 222 includes a floating link 338, a rocker arm 340, and a connecting link 342. The floating link 338 is pivotally coupled to the crank arm 218 by a coupler 344. The rocker arm 340 is pivotally coupled to the floating link 338 by a coupler 346 and to a stationary structure (e.g., a main frame 200 of the harvesting machine 100) by a coupler 348. The connecting link 342 is pivotally coupled to each of the floating link 338 and the rocker arm 340 by the coupler 346. The connecting link 342 is configured to interface with the plunger 220 to cause movement thereof along the longitudinal axis LA. More specifically, the connecting link 342 is sized for receipt through a slot 354 of the plunger 220 and configured for interaction (e.g., contact or direct engagement) with a surface 356 of the plunger 220 to cause movement thereof. In some embodiments, the slot 354 may be formed in a linkage interface 358 that is coupled to, and extends outwardly away from, a frame 360 of the plunger 220.

In the illustrative embodiment, the compression system 216 includes a crank arm 218' and a linkage 222' coupled between the crank arm 218' and the plunger 220. The crank arm 218' is substantially identical to the crank arm 218 and rotatable about the crank arm axis CA in response to rotation provided by the rotational power source. In some embodiments, the crank arms 218, 218' may include respective passages 319, 319' that are sized to receive a shaft (not shown) coupled to the rotational power source. The linkage 222' is substantially identical to the linkage 222 and includes a floating link 338', a rocker arm 340', and a connecting link 342' that are substantially identical to the floating link 338, the rocker arm 340, and the connecting link 342, respectively. The floating link 338' is pivotally coupled to the crank arm 218' by a coupler 344,' the rocker arm 340' is pivotally coupled to the floating link 338' by a coupler 346' and to a stationary structure by the coupler 348, and the connecting link 342' is pivotally coupled to each of the floating link 338' and the rocker arm 340' by the coupler 346'. The connecting link 342' is sized for receipt through a slot 354' of the plunger 220 and configured for interaction with the surface 356. In some embodiments, the slot 354' is formed in the linkage interface 358.

It should be appreciated that in operation of the compression system 216, the crank arms 218, 218' rotate substantially contemporaneously, and in congruence with one another, about the crank arm axis CA. Furthermore, it should be appreciated that the linkages 222, 222' (and the corresponding components) move substantially contemporaneously, and in congruence with one another, to convert the circular motion of the crank arms 218, 218' into the reciprocal motion of the plunger 220. Thus, in the illustrative embodiment, two crank arms 218, 218' and two linkages 222, 222' are operable in combination to drive movement of the plunger 220 in the compression chamber 226. In other embodiments, however, another suitable number of crank arms and linkages may be employed to drive movement of the plunger 220. For example, in some embodiments, one crank arm and one linkage may be employed to drive movement of the plunger 220.

The illustrative plunger 220 includes the frame 360 having ends 362, 364 that are arranged opposite one another, as well as two rollers 366, 368 that are coupled to the frame 360 adjacent the end 364 and configured for rotation about an axis RA. In use, the plunger 220 interacts with crop material 106 along the end 364 to produce crop packages 108. Additionally, in operation, the rollers 366, 368 contact a support surface 370 of the compression chamber 226 to permit movement of the plunger 220 along the longitudinal axis LA. Due at least in part to the positioning of the rollers 366, 368 adjacent the end 364, prior to being moved along the axis LA, the plunger 220 may be pivoted or tilted about the axis RA, particularly when moved from a stationary or at-rest position.

In one embodiment, the harvesting machine 100 includes the main frame 200, a drive mechanism (e.g., the drive unit 124 and/or the PTO shaft, flywheel, transmission) that includes the crank arm 218, the plunger 220, a linkage system that is embodied as, or otherwise includes, the connecting link 342 and the rocker arm 340, and a link that is embodied as, or otherwise includes, the floating link 338. The drive mechanism is coupled to the main frame 200 and the linkage system couples the plunger 220 to the main frame 200 (e.g., through the coupler 348). The floating link 338 couples the linkage system to the crank arm 218. The position of the plunger 220 along the longitudinal axis LA is controlled at least in part by the linkage system. The position of the linkage system is controlled by at least one of a position of the crank arm 218 about the crank arm axis CA and a length of the floating link 338.

Referring now to FIGS. 4-10, operation of the compression system 216 is depicted in various states over a single operational cycle. A single operational cycle corresponds to, or is otherwise associated with, 360 degrees of crank arm 218 rotation about the crank arm axis CA in the counterclockwise direction CCW. Of course, it should be appreciated that in other configurations of the compression system 216, a single cycle may be characterized by clockwise rotation about the axis CA. In any case, the crank arms 218, 218' and the linkages 222, 222' move together in use of the system 216, as indicated above. For the purposes of simplicity, the description below includes an operational discussion of the crank arm 218 and the linkage 222 and omits references to the corresponding features 218', 222'. That being said, it should be understood that throughout each operational cycle, each crank arm 218 and the rocker arm 340 of each linkage 222 rotate about respective axes CA, AA and are constrained against linear translation. Moreover, throughout each operational cycle, it should be understood that the pivotal coupling established by the coupler 346 is configured for translation.

Figure 4:
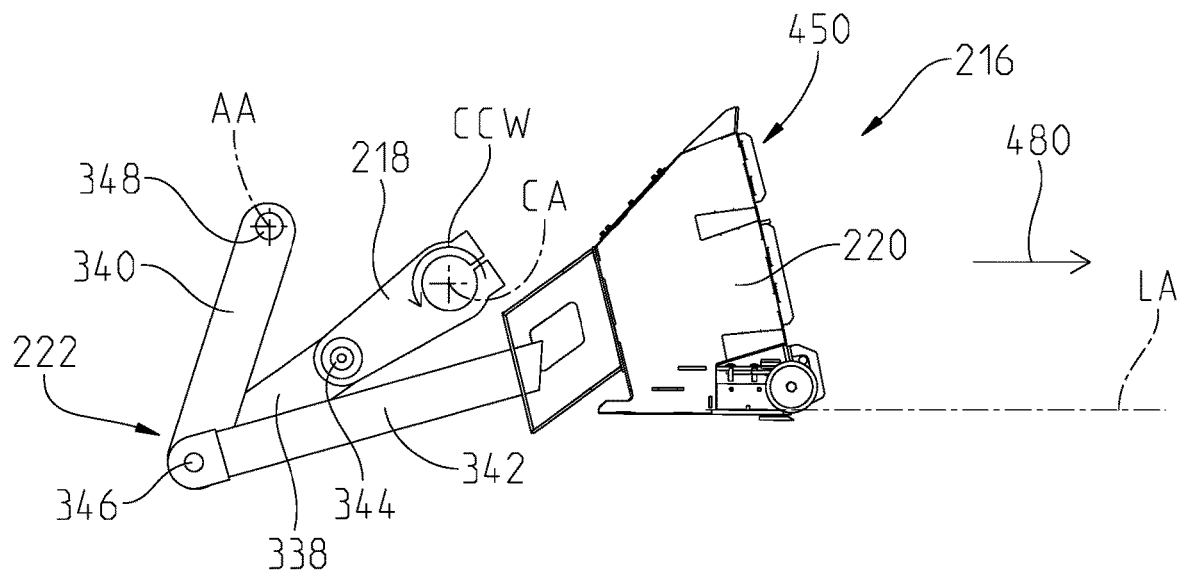
FIG. 4 is a side view of the compression system of FIG. 3 in one operational state that is associated with commencement and completion of an operating cycle of a plunger of the compression system.

The de-stroked position 450 corresponds to, or is otherwise associated with, a forwardmost position of the plunger 220 along the longitudinal axis LA in the compression chamber 226, as depicted in FIG. 4. Thus, as the plunger 220 moves away from the de-stroked position 450 in the direction indicated by arrow 480, the plunger 220 moves rearward through the chamber 226 toward the stroked position 652 to interact with the crop material 106. After moving to the stroked position 652 such that the plunger 220 has its rearmost position along the axis LA, the plunger 220 moves forward through the chamber 226 in the opposite direction indicated by arrow 782 to return to the de-stroked position 450, which completes an operational cycle of the compression system 216.

Figure 5:
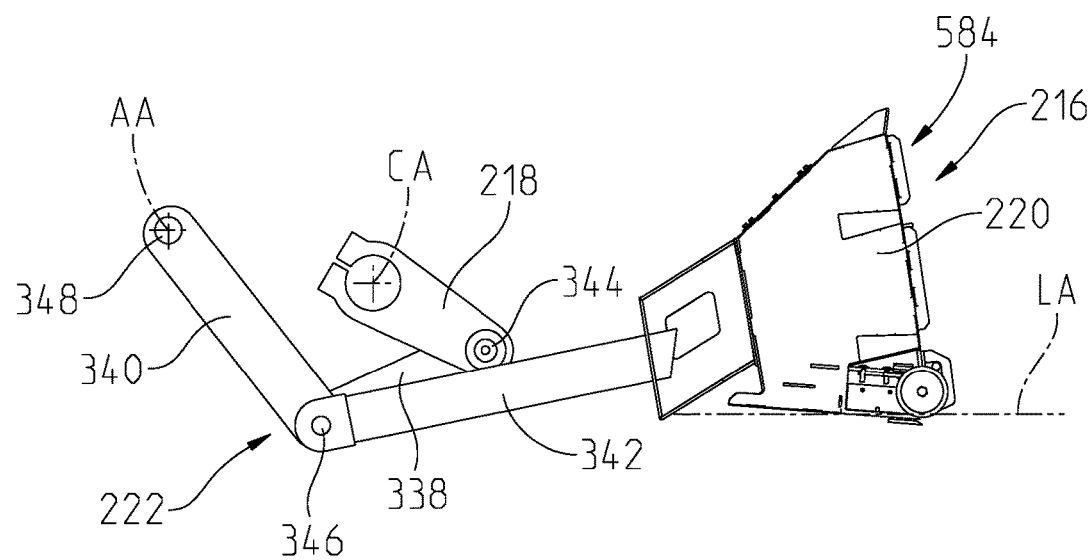
FIG. 5 is a side view of the compression system of FIG. 3 in one operational state that is intermediate commencement and completion of the operating cycle of the plunger.

As shown in FIG. 5, counterclockwise rotation of the crank arm 218 about the crank arm axis CA illustratively advances the plunger 220 in the direction 480 such that the plunger 220 is located intermediate the de-stroked and stroked positions 450, 652 in the intermediate, or partially-stroked, position 584. Subsequent to reaching the position 584, further counterclockwise rotation of the crank arm 218 about the axis CA illustratively advances the plunger 220 in the direction 480 such that the plunger 220 reaches the stroked position 652 shown in FIG. 6. Movement of the plunger 220 to the stroked position 652 from the de-stroked position 450 may be said to define the temporal duration of the working stroke of one plunger 220 operational cycle. In addition to the working stroke, each operational cycle includes a nominal stroke and a return stroke, as discussed below.

Figure 7:
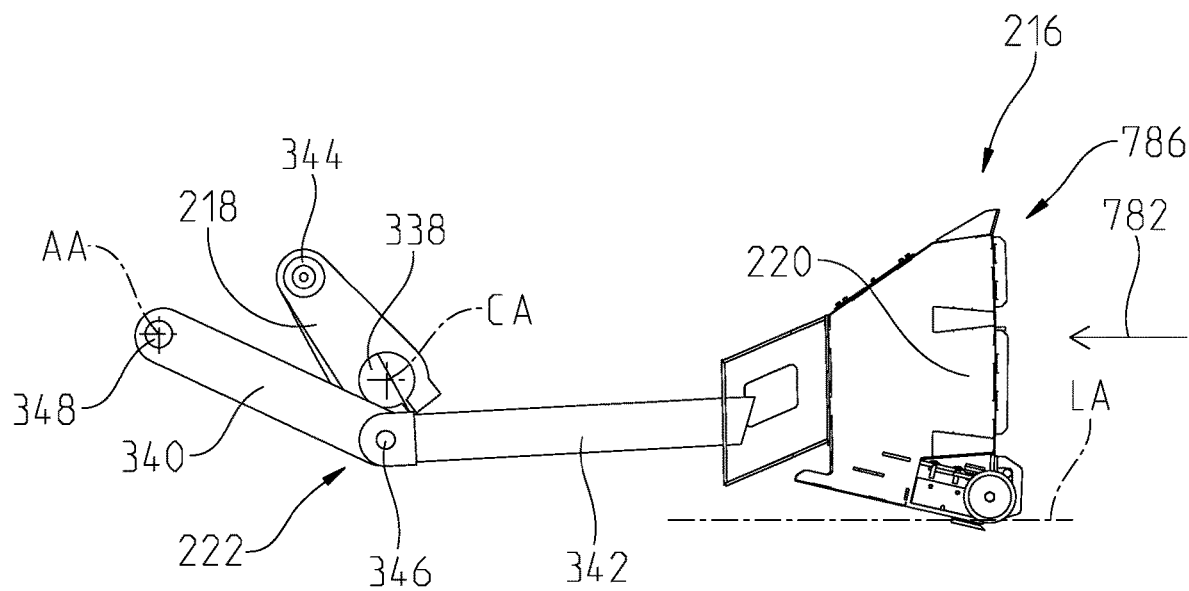
FIG. 7 is a side view of the compression system of FIG. 3 in yet another operational state that is intermediate commencement and completion of the operating cycle of the plunger.

After reaching the stroked position 652, further counterclockwise rotation still of the crank arm 218 about the axis CA is associated with minimal or nominal movement of the plunger 220 from the stroked position 652 to the illustrative position 786 shown in FIG. 7. In the illustrative embodiment, the positions 652, 786 of the plunger 220 may be spaced from one another by about 5 millimeters or less along the axis LA. Movement of the plunger 220 to the position 786 from the stroked position 652 may be said to define the temporal duration of the nominal stroke of one plunger 220 operational cycle.

Following attainment of the position 786, it should be appreciated that further counterclockwise rotation of the crank arm 218 about the crank arm axis CA retracts the plunger 220 in the direction 782 such that the plunger 220 reaches the de-stroked position 450. Movement of the plunger 220 to the de-stroked position 450 from the position 786 may said to define the temporal duration of the return stroke of one plunger 220 operational cycle, which concludes a single operational cycle of the compression system 216.

Figure 8:
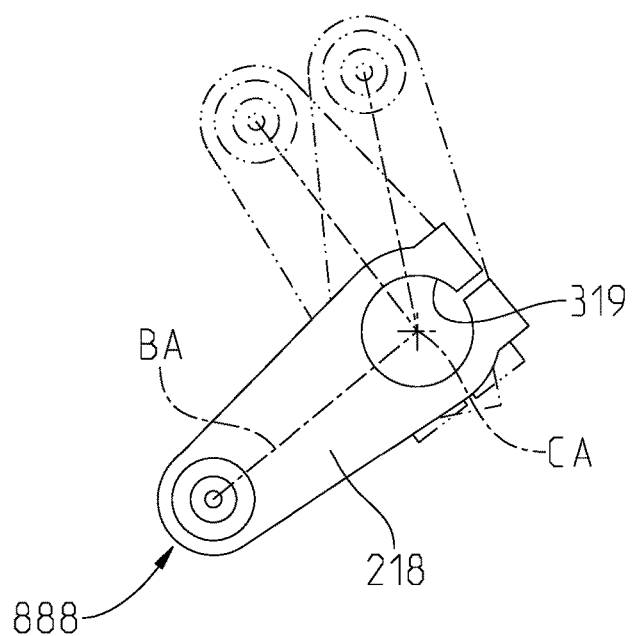
FIG. 8 is a side view of a crank arm of the compression system in a position substantially corresponding to the crank arm position shown in FIG. 4, with other elements of the compression system omitted for the sake of simplicity.
Figure 9:
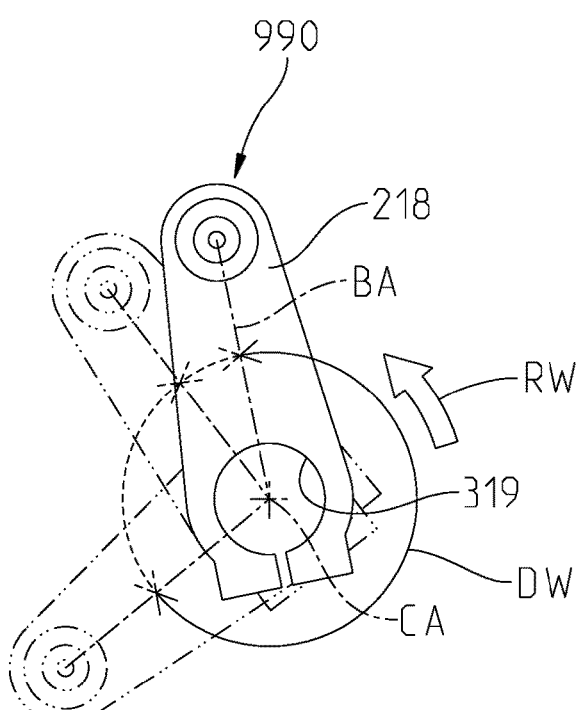
FIG. 9 is a side view of the crank arm in a position substantially corresponding to the crank arm position shown in FIG. 6, with other elements of the compression system omitted.
Figure 10:
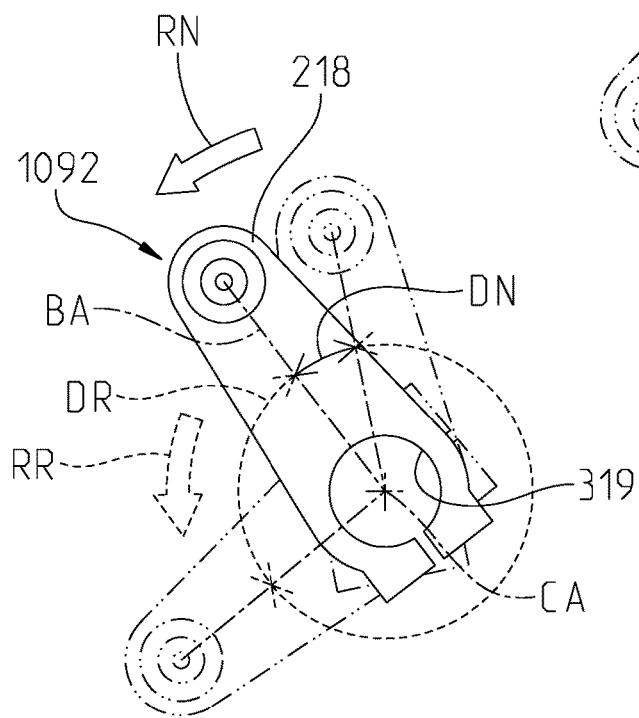
FIG. 10 is a side view of the crank arm in a position substantially corresponding to the crank arm position shown in FIG. 7, with other elements of the compression system omitted.

The crank arm 218 of the compression system 216 is depicted in various positional states in FIGS. 8-10. Counterclockwise rotation (or lack thereof) of the crank arm 218 about the crank arm axis CA shown in FIGS. 8-10 substantially matches the rotation shown in FIGS. 4, 6, and 7. As such, the positional state 888 (see FIG. 8) of the crank arm 218 about the axis CA is substantially similar to the positional state depicted in FIG. 4, the positional state 990 (see FIG. 9) of the crank arm 218 about the axis CA is substantially similar to the positional state depicted in FIG. 6, and the positional state 1092 (see FIG. 10) of the crank arm 218 about the axis CA is substantially similar to the positional state depicted in FIG. 7.

The positional state 888 of the crank arm 218 about the crank arm axis CA is shown in solid in FIG. 8, whereas the positional states 990, 1092 are depicted in phantom. When one operational cycle of the compression system 216 begins, or when one operational cycle of the compression system 216 concludes, the crank arm 218 is in the state 888 relative to the axis CA. A bisecting axis BA extends from the axis CA along the crank arm 218 to bisect the crank arm 218. As indicated above, the crank arm 218 rotates counterclockwise about the axis CA toward the positional states 990, 1092.

The positional state 990 of the crank arm 218 about the crank arm axis CA is shown in solid in FIG. 9, whereas the positional states 888, 1092 are depicted in phantom. When the working stroke of the compression system 216 concludes during one operational cycle, the crank arm 218 is in the state 990 relative to the axis CA. In the positional state 990, the bisecting axis BA is angularly spaced 245 degrees from its position in the state 888. That is, the working stroke is associated with rotation RW of the crank arm 218 that corresponds to the angular displacement DW, which is illustratively represented as 245 degrees measured in the counterclockwise direction about the axis CA.

The positional state 1092 of the crank arm 218 about the crank arm axis CA is shown in solid in FIG. 10, whereas the positional states 888, 990 are shown in phantom. When the nominal stroke of the compression system 216 concludes during one operational cycle, the crank arm 218 is in the state 1092 relative the axis CA. In the positional state 1092, the bisecting axis BA is angularly spaced 25 degrees from its position in the state 990. That is, the nominal stroke is associated with rotation RN of the crank arm 218 that corresponds to an angular displacement DN, which is illustratively represented as 25 degrees measured in the counterclockwise direction about the axis CA.

It should be appreciated, of course, that subsequent to the conclusion of the nominal stroke of the compression system 216 during one operational cycle, the crank arm 218 rotates counterclockwise about the crank arm axis CA to return to the positional state 888 and complete the return stroke, as indicated in FIG. 10. As such, the return stroke is associated with rotation RR of the crank arm 218 that corresponds to the angular displacement DR, which is illustratively represented as 90 degrees measured in the counterclockwise direction about the axis CA.

Figure 11:
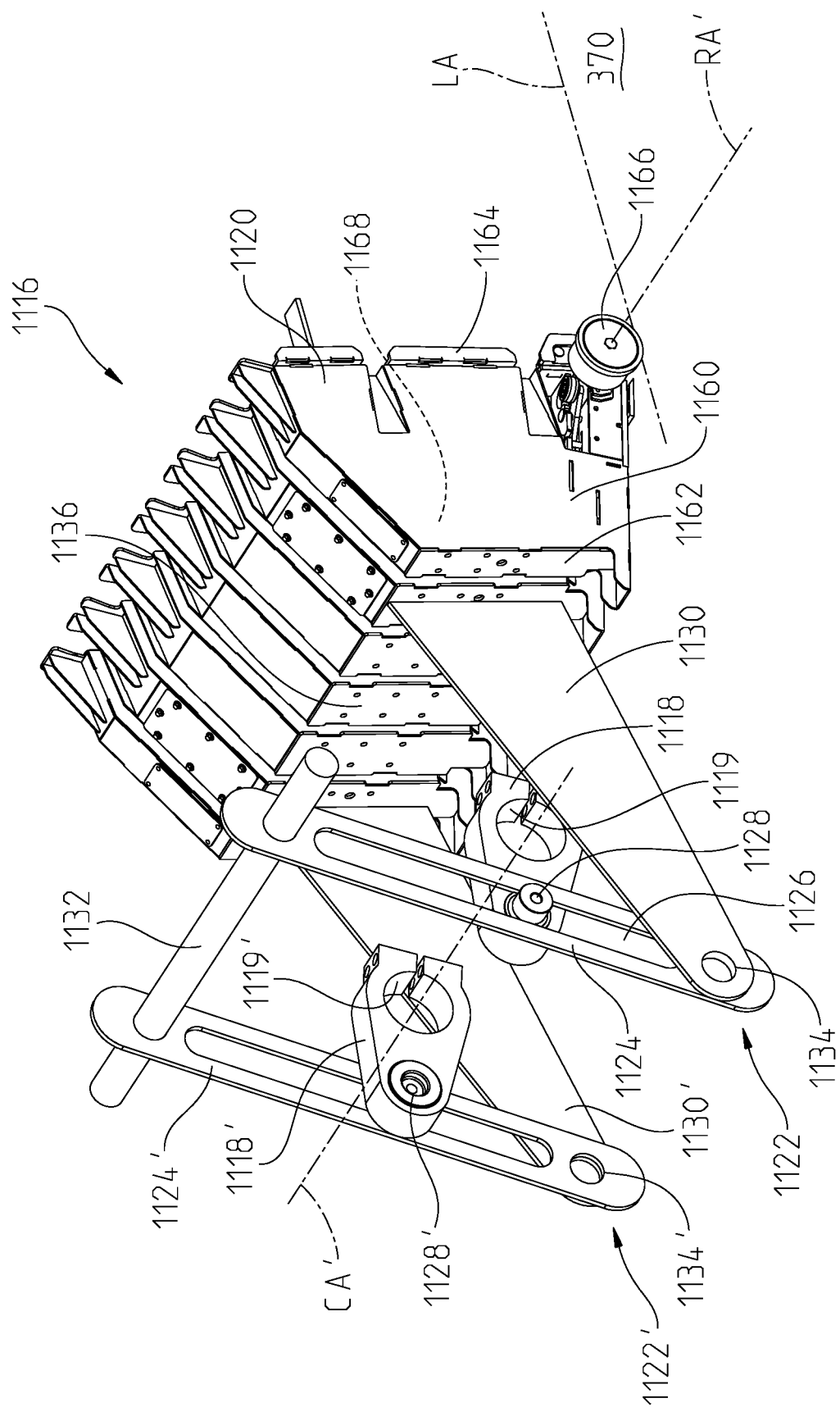
FIG. 11 is a perspective view of another embodiment of the compression system depicted in FIG. 2.

Referring now to FIG. 11, in the illustrative embodiment, the compression system 1116 includes a crank arm 1118, a plunger 1120, and a linkage 1122. In some embodiments, the compression system 1116 may be incorporated into the harvesting machine 100 in place of the compression system 216. In other embodiments, the compression system 1116 may be incorporated into the harvesting machine 100 in combination with the compression system 216.

Figure 14:
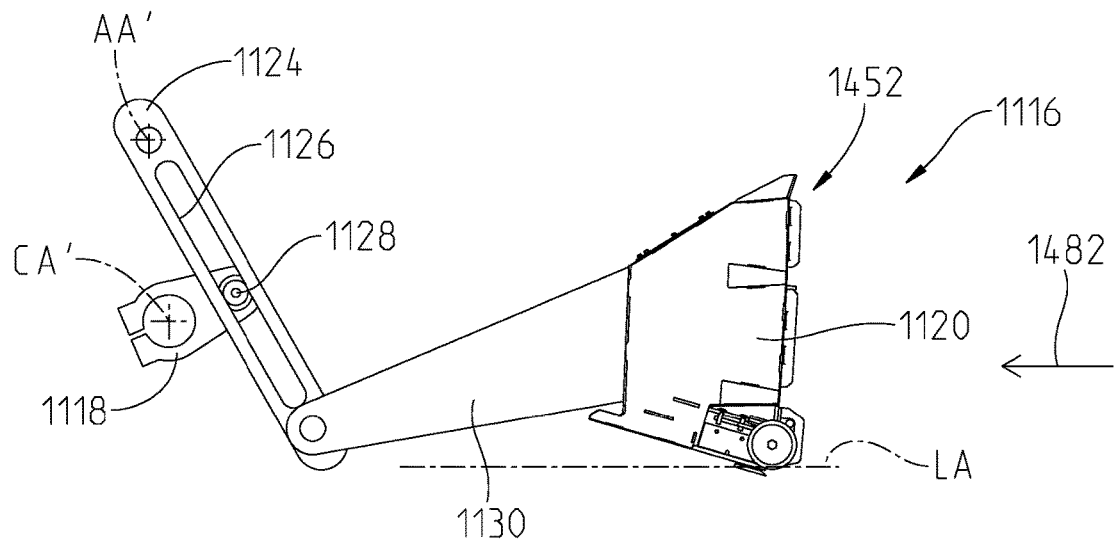
FIG. 14 is a side view of the compression system of FIG. 11 in another operational state that is intermediate commencement and completion of the operating cycle of the plunger.

The crank arm 1118, the plunger 1120, and the linkage 1122 may be similar to the crank arm 218, the plunger 220, and the linkage 222. Like the linkage 222, the linkage 1122 is coupled between the plunger 1120 and the crank arm 1118 to convert rotation of the crank arm 1118 about a crank arm axis CA' into movement of the plunger 1120. That is, the linkage 1122 is configured to drive movement of the plunger 1120 from a de-stroked position 1250 (see FIG. 12) to a stroked position 1452 (see FIG. 14) in response to rotation RW' (see FIG. 16) of the crank arm 1118 about the axis CA', and from the stroked position 1452 to the de-stroked position 1250 in response to rotation RR' (see FIG. 16) of the crank arm 1118 about the axis CA'. As described in greater detail below, rotation RW' corresponds to an angular displacement DW' that is greater than an angular displacement DR' corresponding to rotation RR'.

As used hereafter, one working or compression stroke of the compression system 1116 is associated with, or otherwise corresponds to, movement of the plunger 1120 from the de-stroked position 1250 to the stroked position 1452. Conversely, one return stroke of the compression system 1116 is associated with, or otherwise corresponds to, movement of the plunger 1120 from the stroked position 1452 to the de-stroked position 1250. The return stroke of the plunger 1120 may be completed in less time than the working stroke during a single operating cycle of the compression system 1116. As a consequence, compared to other configurations with different operating cycles, the compression system 1116 may allow more crop material 106 to be added into the chamber 226 during operation, which may facilitate increased throughput (or bale production capacity) of the harvesting machine 100. Compared to compression systems incorporating mechanisms different from the linkage 1122, loads experienced by components of the compression system 1116 (e.g., torque loads experienced by the crank arm 1118 and/or components of the linkage 1122) may be decreased, thereby extending component useful life. Even more, compared to other configurations with different operating cycles and mechanisms different from the linkage 1122, the compression system 1116 may deform, compress, compact, and/or densify crop material 106 to a greater degree in operation.

The illustrative compression system 1116 is depicted in detail in FIG. 11 with certain elements of the harvesting machine 100 omitted for the sake of simplicity and clarity. In the illustrative embodiment, the linkage 1122 includes a control arm 1124, a control coupler 1128, and a connecting link 1130. The control arm 1124 is pivotally coupled to the crank arm 1118 by the control coupler 1128, and the control coupler 1128 is movable in a slot 1126 formed in the control arm 1124 in response to rotation of the crank arm 1118 about the crank arm axis CA'. The control arm 1124 is pivotally coupled to a stationary structure (e.g., the main frame 200 of the harvesting machine 100) by a coupler 1132. The connecting link 1130 is pivotally coupled to the control arm 1124 by a coupler 1134. The connecting link 1130 is configured to interface with the plunger 1120 to cause movement thereof along the longitudinal axis LA. More specifically, the connecting link 1130 is configured for interaction (e.g., contact or direct engagement) with a surface 1136 of the plunger 1120 to cause movement thereof.

In the illustrative embodiment, the compression system 1116 includes a crank arm 1118' and a linkage 1122' coupled between the crank arm 1118' and the plunger 1120. The crank arm 1118' is substantially identical to the crank arm 1118 and rotatable about the crank arm axis CA' in response to rotation provided by the rotational power source. In some embodiments, the crank arms 1118, 1118' may include respective passages 1119, 1119' that are sized to receive a shaft (not shown) coupled to the rotational power source. The linkage 1122' is substantially identical to the linkage 1122 and includes a control arm 1124', a control coupler 1128', and a connecting link 1130' that are substantially identical to the control arm 1124, the control coupler 1128, and the connecting link 1130, respectively. The control arm 1124' is pivotally coupled to the crank arm 1118' by the control coupler 1128', the control coupler 1128' is movable in a slot 1126' formed in the control arm 1124' in response to rotation of the crank arm 1118' about the axis CA', and the control arm 1124' is pivotally coupled to the stationary structure and the control arm 1124 by the coupler 1132. The connecting link 1130' is pivotally coupled to the control arm 1124' by a coupler 1134'. The connecting link 1130' is configured to interface with the surface 1136 of the plunger 1120 to cause movement thereof along the longitudinal axis LA.

It should be appreciated that in operation of the compression system 1116, the crank arms 1118, 1118' rotate substantially contemporaneously, and in congruence with one another, about the crank arm axis CA'. Furthermore, it should be appreciated that the linkages 1122, 1122' (and the corresponding components) move substantially contemporaneously, and in congruence with one another, to convert the circular motion of the crank arms 1118, 1118' into the reciprocal motion of the plunger 1120. Thus, in the illustrative embodiment, two crank arms 1118, 1118' and two linkages 1122, 1122' are operable in combination to drive movement of the plunger 1120 in the compression chamber 226. In other embodiments, however, another suitable number of crank arms and linkages may be employed to drive movement of the plunger 1120. For example, in some embodiments, one crank arm and one linkage may be employed to drive movement of the plunger 1120.

The illustrative plunger 1120 includes a frame 1160 having ends 1162, 1164 that are arranged opposite one another, as well as two rollers 1166, 1168 that are coupled to the frame 1160 adjacent the end 1164 and configured for rotation about an axis RA'. In use, the plunger 1120 interacts with crop material 106 along the end 1164 to produce crop packages 108. Additionally, in operation, the rollers 1166, 1168 contact the support surface 370 of the compression chamber 226 to permit movement of the plunger 1120 along the longitudinal axis LA. Due at least in part to the positioning of the rollers 1166, 1168 adjacent the end 1164, prior to being moved along the axis LA, the plunger 1120 may be pivoted or tilted about the axis RA', particularly when moved from a stationary or at-rest position.

In one embodiment, the harvesting machine 100 includes the main frame 200, a drive mechanism (e.g., the drive unit 124 and/or the PTO shaft, flywheel, transmission) that includes the crank arm 1118, the plunger 1120, and a linkage system that is embodied as, or otherwise includes, the connecting link 1130, the control arm 1124, and the control coupler 1128. The drive mechanism is coupled to the main frame 200 and the linkage system couples the plunger 1120 to the main frame 200 (e.g., through the coupler 1132). The linkage system is coupled to the crank arm 1118. The position of the plunger 1120 along the longitudinal axis LA is controlled at least in part by the linkage system. The position of the linkage system is controlled by a position of the crank arm 1118 about the crank arm axis CA'.

Referring now to FIGS. 12-16, operation of the compression system 1116 is depicted in various states over a single operational cycle. A single operational cycle corresponds to, or is otherwise associated with, 360 degrees of crank arm 1118 rotation about the crank arm axis CA' in the counterclockwise direction CCW. Of course, it should be appreciated that in other configurations of the compression system 1116, a single cycle may be characterized by clockwise rotation about the axis CA'. In any case, the crank arms 1118, 1118' and the linkages 1122, 1122' move together in use of the system 1116, as indicated above. For the purposes of simplicity, the description below includes an operational discussion of the crank arm 1118 and the linkage 1122 and omits references to the corresponding features 1118', 1122'. That being said, it should be understood that throughout each operational cycle, each crank arm 1118 and the control arm 1124 of each linkage 1122 rotate about respective axes CA', AA' and are constrained against linear translation. Moreover, throughout each operational cycle, it should be understood that the pivotal coupling established by each coupler 1134 is configured for translation.

Figure 12:
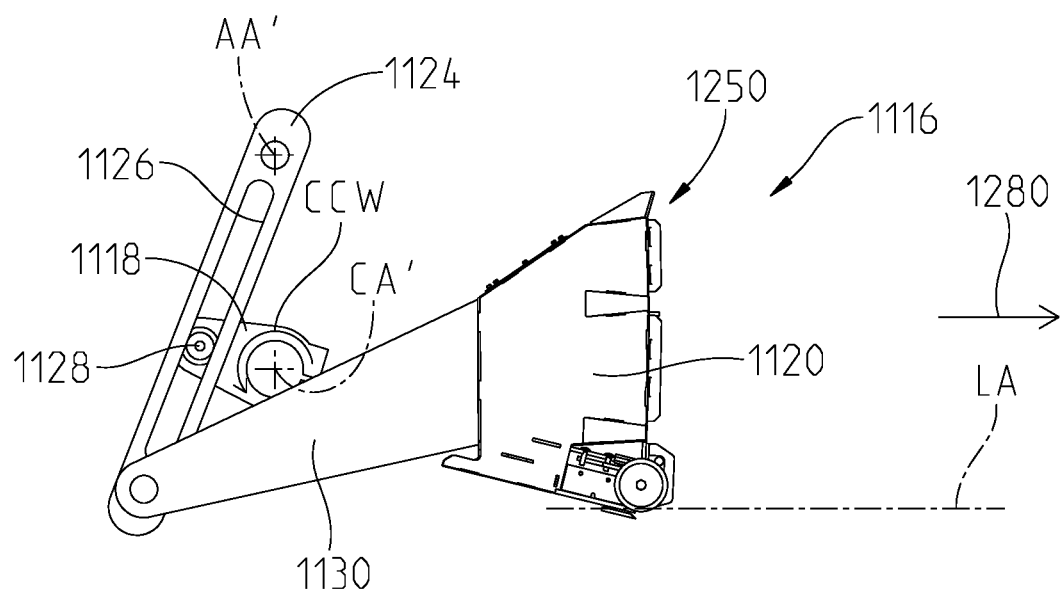
FIG. 12 is a side view of the compression system of FIG. 11 in one operational state that is associated with commencement and completion of an operating cycle of a plunger of the compression system.

The de-stroked position 1250 corresponds to, or is otherwise associated with, a forwardmost position of the plunger 1120 along the longitudinal axis LA in the compression chamber 226, as depicted in FIG. 12. The de-stroked position 1250 of the plunger 1120 is therefore similar to the de-stroked position 450 of the plunger 220. As the plunger 1120 moves away from the de-stroked position 1250 in the direction indicated by arrow 1280, the plunger 1120 moves rearward through the chamber 226 toward the stroked position 1452 to interact with the crop material 106. After moving to the stroked position 1452 such that the plunger 1120 has its rearmost position along the axis LA, the plunger 1120 moves forward through the chamber 226 in the opposite direction indicated by arrow 1482 to return to the de-stroked position 1250, which completes an operational cycle of the compression system 1116.

Figure 13:
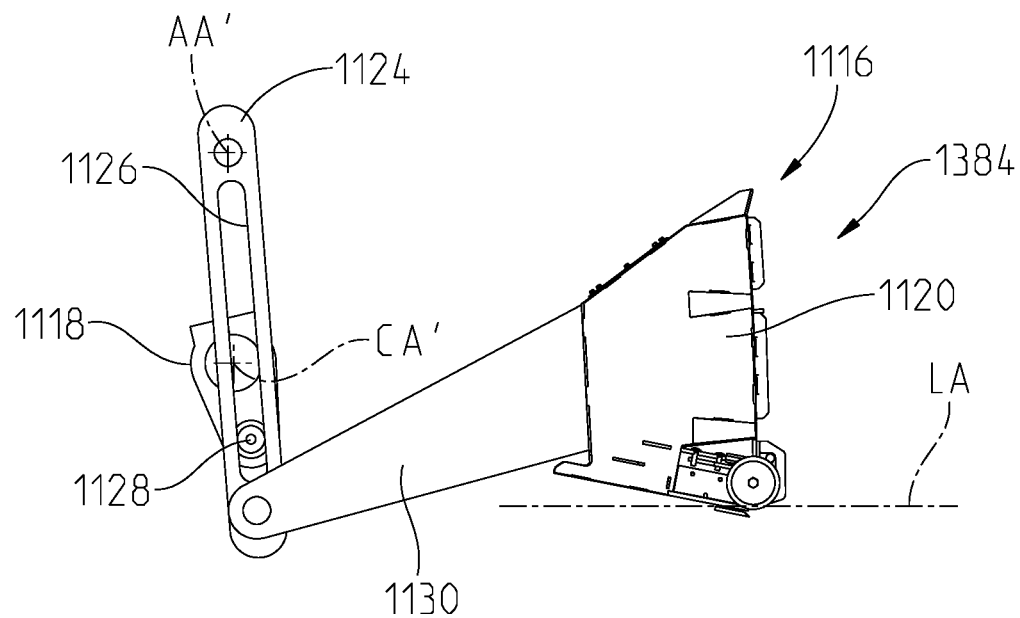
FIG. 13 is a side view of the compression system of FIG. 11 in one operational state that is intermediate commencement and completion of the operating cycle of the plunger.

As shown in FIG. 13, counterclockwise rotation of the crank arm 1118 about the crank arm axis CA' illustratively advances the plunger 1120 in the direction 1280 such that the plunger 1120 is located intermediate the de-stroked and stroked positions 1250, 1452 in the intermediate, or partially-stroked, position 1384. Subsequent to reaching the position 1384, further counterclockwise rotation of the crank arm 1118 about the axis CA' illustratively advances the plunger 1120 in the direction 1280 such that the plunger 1120 reaches the stroked position 1452 shown in FIG. 14.

Movement of the plunger 1120 to the stroked position 1452 from the de-stroked position 1250 may be said to define the temporal duration of the working stroke of one plunger 1120 operational cycle.

Following attainment of the position 1452, it should be appreciated that further counterclockwise rotation of the crank arm 1118 about the crank arm axis CA' retracts the plunger 1120 in the direction 1482 such that the plunger 1120 reaches the de-stroked position 1250. Movement of the plunger 1120 to the de-stroked position 1250 from the position 1452 may be said to define the temporal duration of the return stroke of one plunger 1120 operational cycle, which concludes a single operational cycle of the compression system 1116.

Figure 15:
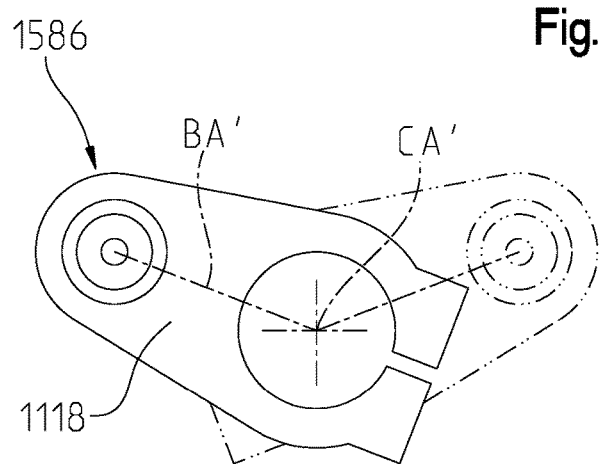
FIG. 15 is a side view of a crank arm of the compression system in a position substantially corresponding to the crank arm position shown in FIG. 12, with other elements of the compression system omitted for the sake of simplicity.
Figure 16:
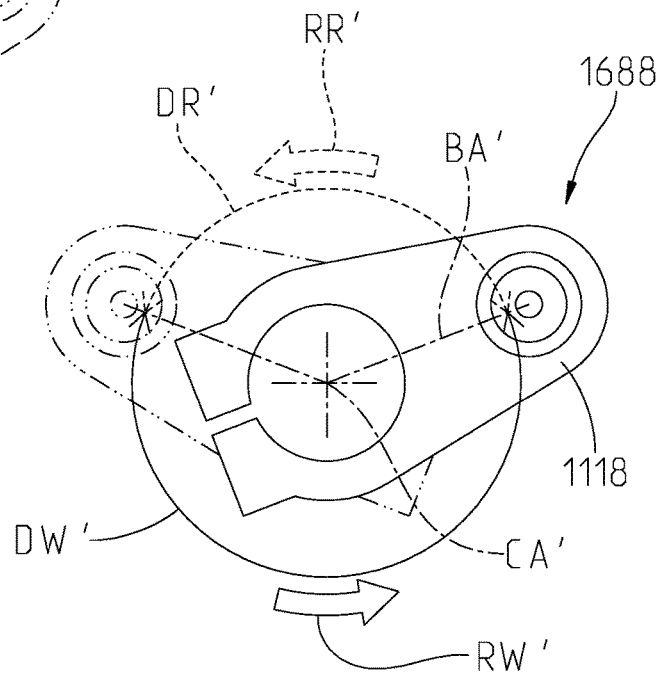
FIG. 16 is a side view of the crank arm of the compression system in a position substantially corresponding to the crank arm position shown in FIG. 14, with other elements of the compression system omitted.

The crank arm 1118 of the compression system 1116 is depicted in various positional states in FIGS. 15 and 16. Counterclockwise rotation (or lack thereof) of the crank arm 1118 about the crank arm axis CA' shown in FIGS. 15 and 16 substantially matches the rotation shown in FIGS. 12 and 14. As such, the positional state 1586 (see FIG. 15) of the crank arm 1118 about the axis CA' is substantially similar to the positional state depicted in FIG. 12, and the positional state 1688 (see FIG. 16) of the crank arm 1118 about the axis CA' is substantially similar to the positional state depicted in FIG. 14.

The positional state 1586 of the crank arm 1118 about the crank arm axis CA' is shown in solid in FIG. 15, whereas the positional state 1688 is depicted in phantom. When one operational cycle of the compression system 1116 begins, or when one operational cycle of the compression system 1116 concludes, the crank arm 1118 is in the state 1586 relative to the axis CA'. A bisecting axis BA' extends from the axis CA' along the crank arm 1118 to bisect the crank arm 1118. As indicated above, the crank arm 1118 rotates counterclockwise about the axis CA' toward the positional state 1688.

The positional state 1688 of the crank arm 1118 about the crank arm axis CA' is shown in solid in FIG. 16, whereas the positional state 1586 is depicted in phantom. When the working stroke of the compression system 1116 concludes during one operational cycle, the crank arm 1118 is in the state 1688 relative to the axis CA'. In the positional state 1688, the bisecting axis BA' is angularly spaced 220 degrees from its position in the state 1586. That is, the working stroke is associated with rotation RW' of the crank arm 1118 that corresponds to the angular displacement DW', which is illustratively represented as 220 degrees measured in the counterclockwise direction about the axis CA'.

It should be appreciated, of course, that subsequent to the conclusion of the working stroke of the compression system 1116 during one operational cycle, the crank arm 1118 rotates counterclockwise about the crank arm axis CA' to return to the positional state 1586 and complete the return stroke, as indicated in FIG. 16. As such, the return stroke is associated with rotation RR' of the crank arm 1118 that corresponds to the angular displacement DR', which is illustratively represented as 140 degrees measured in the counterclockwise direction about the axis CA'.

Figure 17:
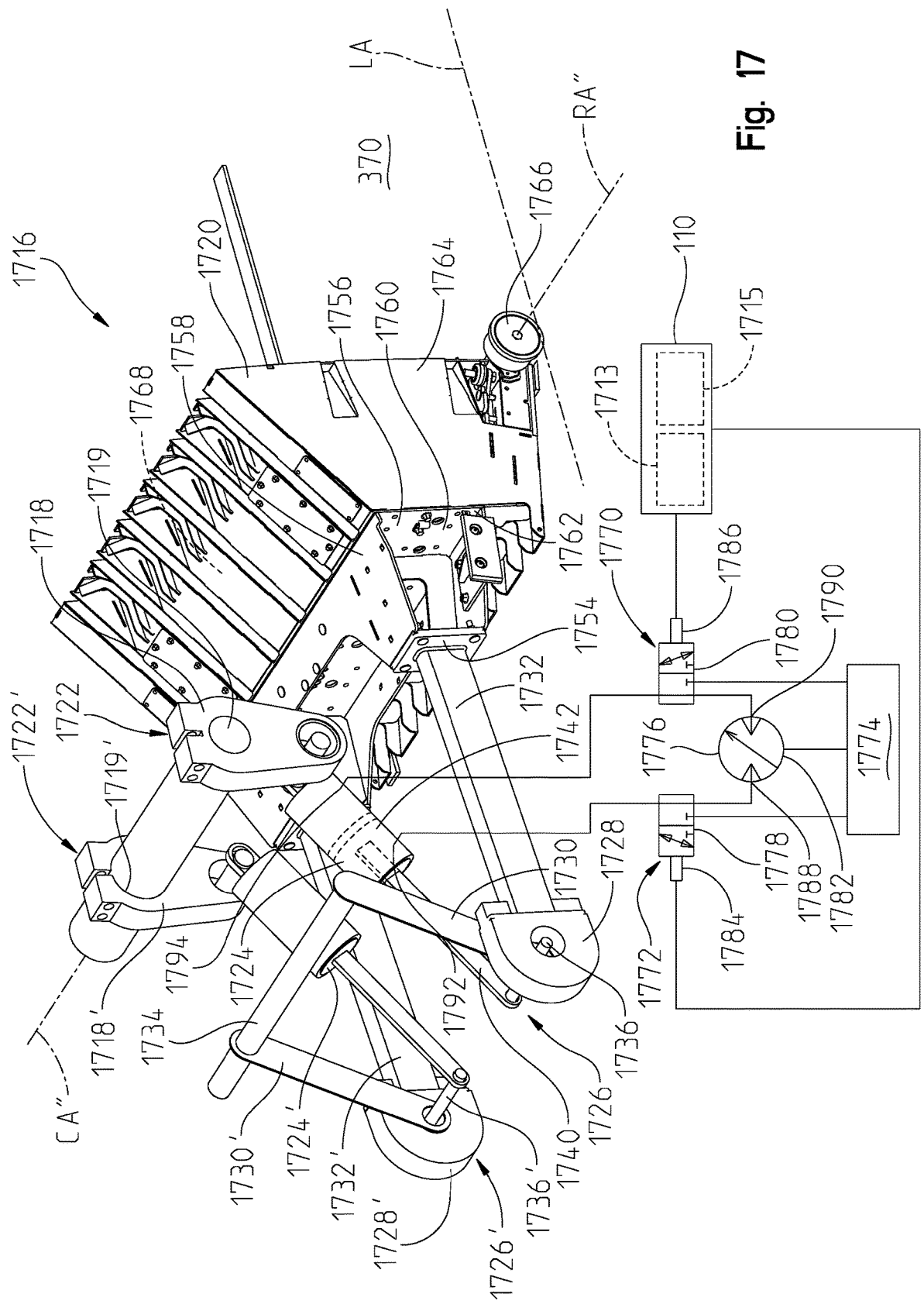
FIG. 17 is a perspective view of yet another embodiment of the compression system depicted in FIG. 2, with a schematic depiction of a hydraulic circuit that may be included in the compression system.

Referring now to FIG. 17, in the illustrative embodiment, the compression system 1716 includes a crank arm 1718, a plunger 1720, and a drive assembly 1722. In some embodiments, the compression system 1716 may be incorporated into the harvesting machine 100 in place of the compression system 216 or the compression system 1116. In other embodiments, the compression system 1716 may be incorporated into the harvesting machine 100 in combination with one or more of the compression systems 216, 1116.

In the illustrative embodiment, the crank arm 1718 is rotatable about a crank arm axis CA" in response to rotational power provided to the crank arm 1718 by a rotational power source. The plunger 1720 is coupled to the crank arm 1718 and reciprocally movable (i.e., in a linear back-and-forth manner) along the longitudinal axis LA in the compression chamber 226. The drive assembly 1722 is coupled between the plunger 1720 and the crank arm 1718 and includes an actuator 1724. The actuator 1724 is configured for movement between a retracted position 1850 (see FIG. 18) and an extended position 2052 (see FIG. 20) to vary a length of the actuator 1724 without corresponding variation of a length of another component of the harvesting machine 100, such as the crank arm 1718 or a component of a linkage 1726 included in the drive assembly 1722, for example. The drive assembly is operable in an operating mode 1810 (see FIGS. 18-20) of the harvesting machine 100 in which rotation of the crank arm 1718 about the axis CA" is coupled and/or synchronized with reciprocal movement of the plunger 1718 along the longitudinal axis LA. Additionally, the drive assembly 1722 is operable in an operating mode 2112 (see FIGS. 21-23) of the harvesting machine 100 in which rotation of the crank arm 1718 about the axis CA" is de-coupled and/or de-synchronized from reciprocal movement of the plunger 1720 along the axis LA.

In some situations, a large amount of rotational power may be needed to initiate movement of powertrain and/or drivetrain components of the harvesting machine 100, such as the flywheel or components of the transmission, for example. An even greater amount of rotational power may be needed to initiate operation of the plunger 1718 in addition to those components. Even more, during a plugged condition of the harvesting machine 100 (e.g., when compression of crop material 106 contained the chamber 226 may be required in order to initiate movement of the plunger 1718), an even greater amount of torque still may be needed to initiate operation of the plunger 1718 in addition to the aforementioned components. Therefore, to enable initial movement of components of the harvesting machine 100 and avoid damage or excessive wear of those components over repeated use of the machine 100, it may be desirable to de-couple and/or de-synchronize movement of some components (e.g., the plunger 1720) from other components (e.g., the PTO shaft, the flywheel, the transmission, and/or the crank arm 1718).

In the illustrative embodiment, the operating mode 2112 of the harvesting machine 100, in which rotation of the crank arm 1718 is de-coupled and/or de-synchronized from movement of the plunger 1720 as indicated above, may be embodied as, or otherwise include, a start-up operational mode. In the start-up mode, components of the machine 100 (e.g., the PTO shaft, the flywheel, the transmission, and/or the crank arm 1718) may be operated to reach a reference or predetermined speed associated with runtime operation of the machine 100. Once those components have reached that reference speed, the machine 100 may then be operated in a runtime operational mode in which rotation of the crank arm 1718 is coupled and/or synchronized with movement of the plunger 1720. Thus, the operating mode 1810 may be embodied as, or otherwise include, a runtime operational mode of the machine 100.

As mentioned above, the illustrative harvesting machine 100 includes one or more controllers 110. The one or more controllers 110 may be configured to execute various control and/or computational functions of the machine 100. As such, the controller(s) 110 may be communicatively coupled to various actuators (e.g., the actuator 1724), sensors, and other devices within, or remote from, the machine 100. Discussion of various communicative coupling arrangements for the harvesting machine 100 may be provided in U.S. Patent Application Publication No. 2015/0208586, entitled "Baler Plunger-Position Sensor Assembly and Method," the disclosure of which is hereby incorporated by reference. In any case, it should be appreciated that the controller(s) 110 may be used to control operation of the compression systems 216, 1116, 1716 based on input provided by various components (e.g., sensors, actuators, valves, or other devices) of the machine 100. For example, the controller(s) 110 may be used to control operation of the machine 100 in the operating modes 1810, 2112, as well as changes and/or transitions between those modes and/or other operating modes of the machine 100. Additionally, the controller(s) 110 may be used to control operation of an electro-hydraulic control system 1770 in the operating modes 1810, 2112, as well as changes and/or transitions between those modes and/or other operating modes of the machine 100.

In some embodiments, each controller 110 may include one or more processors 1713. Each processor 1713 may be embodied as any type of processor or other compute circuit capable of performing various tasks such as compute functions and/or controlling the functions of the harvesting machine 100 depending on, for example, the type or intended functionality of the harvesting machine 100. In some embodiments, each processor 1713 may be embodied as a single or multi-core processor, a microcontroller, or other processing/controlling circuit. Additionally, in some embodiments, each processor 1713 may be embodied as, include, or be coupled to an FPGA, an application specific integrated circuit (ASIC), reconfigurable hardware or hardware circuitry, or other specialized hardware to facilitate performance of the functions described herein. In some embodiments still, each processor 1713 may be embodied as a high-power processor, an accelerator co-processor, an FPGA, or a storage controller.

In some embodiments, each controller 110 may include one or more memory devices 1715. Each memory device 1715 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). In some embodiments, each memory device 1715 may be embodied as a block addressable memory, such as those based on NAND or NOR technologies. Each memory device 1715 may also include future generation nonvolatile devices or other byte addressable write-in-place nonvolatile memory devices. Additionally, in some embodiments, each memory device 1715 may be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 1715 may refer to the die itself and/or to a packaged memory product. In some embodiments still, 3D crosspoint memory may comprise a transistor-less stackable cross point architecture in which memory cells sit at the intersection of word lines and bit lines and are individually addressable and in which bit storage is based on a change in bulk resistance. In some embodiments yet still, all or a portion of each memory device 1715 may be integrated into the processor(s) 1713. Regardless, each memory device 1715 may store various software and data used during operation such as task request data, kernel map data, telemetry data, applications, programs, libraries, and drivers.

The illustrative compression system 1716 is depicted in FIG. 17 with certain elements of the harvesting machine 100 omitted for the sake of simplicity and clarity. In the illustrative embodiment, in addition to the actuator 1724, the drive assembly 1722 includes the linkage 1726 as indicated above. The actuator 1724 is coupled between the crank arm 1718 and the linkage 1726, and the linkage 1726 is coupled between the actuator 1724 and the plunger 1720.

In the illustrative embodiment, the linkage 1726 includes a coupling hub 1728, a rocker arm 1730, and a connecting link 1732. The coupling hub 1728 is pivotally coupled to the actuator 1724, the rocker arm 1730 is pivotally coupled to the coupling hub 1728, and the connecting link 1732 is pivotally coupled to the coupling hub 1728 and configured to interface with the plunger 1720. The rocker arm 1730 is pivotally coupled to a stationary structure (e.g., the main frame 200 of the harvesting machine) by a coupler 1734. The rocker arm 1730, the actuator 1724, and the connecting link 1732 are pivotally coupled to the coupling hub 1728 by a coupler 1736. The connecting link 1732 is configured to interface with the plunger 1720 to cause movement thereof along the longitudinal axis LA. More specifically, the connecting link 1732 is sized for receipt through a slot 1754 of the plunger 1720 and configured for interaction (e.g., contact or direct engagement) with a surface 1756 of the plunger 1720 to cause movement thereof. In some embodiments, the slot 1754 may be formed in a linkage interface 1758 that is coupled to, and extends outwardly away from, a frame 1760 of the plunger 1720.

In the illustrative embodiment, the compression system 1716 includes a crank arm 1718' and a drive assembly 1722' coupled between the crank arm 1718' and the plunger 1720. The crank arm 1718' is substantially identical to the crank arm 1718 and rotatable about the crank arm axis CA" in response to rotation provided by the rotational power source. In some embodiments, the crank arms 1718, 1718' may include respective passages 1719, 1719' that are sized to receive a shaft that is coupled to the rotational power source. The drive assembly 1722' includes an actuator 1724' that is substantially identical to the actuator 1724, and a linkage 1726' that is substantially identical to the linkage 1726.

The linkage 1726' includes a coupling hub 1728', a rocker arm 1730', and a connecting link 1732'. The coupling hub 1728' is pivotally coupled to the actuator 1724', the rocker arm 1730' is pivotally coupled to the coupling hub 1728', and the connecting link 1732' is pivotally coupled to the coupling hub 1728' and configured to interface with the plunger 1720 in substantially identical fashion to the connecting link 1732. The rocker arm 1730' is pivotally coupled to a stationary structure and the rocker arm 1730 by the coupler 1734. The rocker arm 1730' and the actuator 1724' are pivotally coupled to the coupling hub 1728' by a coupler 1736'.

It should be appreciated that in at least one operating mode (e.g., the mode 1860) of the harvesting machine 100, the crank arms 1718, 1718' rotate substantially contemporaneously, and in congruence with one another, about the crank arm axis CA". Furthermore, it should be appreciated that the drive assemblies 1722, 1722' (and the corresponding components) move substantially contemporaneously, and in congruence with one another, to convert the circular motion of the crank arms 1718, 1718' into the reciprocal motion of the plunger 1720 in that at least one operating mode. Thus, in the illustrative embodiment, two crank arms 1718, 1718' and two drive assemblies 1722, 1722' are operable in combination to drive movement of the plunger 1720 in the compression chamber 226. In other embodiments, however, another suitable number of crank arms and drive assemblies may be employed to drive movement of the plunger 1720. For example, in some embodiments, one crank arm and one drive assembly may be employed to drive movement of the plunger 1720.

The illustrative plunger 1720 includes the frame 1760 having ends 1762, 1764 that are arranged opposite one another, as well as two rollers 1766, 1768 that are coupled to the frame 1760 adjacent the end 1764 and configured for rotation about an axis RA". In use, the plunger 1720 interacts with crop material 106 along the end 1764 to produce crop packages 108. Additionally, in operation, the rollers 1766, 1768 contact the support surface 370 of the compression chamber 226 to permit movement of the plunger 1720 along the longitudinal axis LA. Due at least in part to the positioning of the rollers 1766, 1768 adjacent the end 1764, prior to being moved along the axis LA, the plunger 1720 may be pivoted or tilted about the axis RA", particularly when moved from a stationary or at-rest position.

Each of the actuators 1724, 1724' is illustratively embodied as, or otherwise includes, a hydraulically-operated double-acting cylinder. Using the actuator 1724 as an example, the actuator 1724 includes a piston rod 1740 that is pivotally coupled to the coupler hub 1728 and a cylinder 1742 that is pivotally coupled to the crank arm 1718. The piston rod 1740 is movable in the cylinder 1742 in response to fluid pressure applied thereto to move the actuator 1724 between the retracted and extended positions 1850, 2052. Of course, it should be appreciated that in other embodiments, each of the actuators 1724, 1724' may be embodied as, or otherwise include, another suitable actuator, such as an electrically or pneumatically-operated actuator, for example.

In the illustrative embodiment, the harvesting machine 100 includes a hydraulic or electro-hydraulic control system 1770 that is configured to control operation of certain components of the machine 100, such as the actuators 1724, 1724', for example. The control system 1770 may do so in cooperation with the controller 110. Although the description below is directed to an implementation of an exemplary hydraulic control system, it should be appreciated that an electric or pneumatic system could also be implemented. One example of a hydraulic control system that may be incorporated into the illustrative control system 1770 is the hydraulic system described in U.S. patent application Ser. No. 15/291,754, entitled "Agricultural Baler with Plunger Reposition during Startup Mode," the disclosure of which is incorporated by reference herein in its entirety.

The illustrative control system 1770 includes a hydraulic circuit 1772 that has, among other things, a reservoir 1774, a pump 1776, and electro-hydraulic valves 1778, 1780. The reservoir 1774 is configured to supply hydraulic fluid to an input 1782 of the pump 1776, and the pump 1776 is configured to provide pressurized hydraulic fluid to the valves 1778, 1780 and/or other flow control devices. In some embodiments, the pump 1776 may be embodied as, or otherwise include, a bi-directional variable displacement pump. Additionally, in some embodiments, the pump 1776 may be configured for operation in a supply mode, in which the pump 1776 supplies pressurized hydraulic fluid to other components (e.g., the valves 1778, 1780) of the circuit 1772, and a neutral mode, in which the pump 1776 does not supply pressurized fluid to other components of the circuit 1772.

Each of the valves 1778, 1780 is illustratively embodied as, or otherwise includes, a solenoid valve having an element (e.g., a spool, a plunger, or the like) that is movable (e.g., in a valve bore, valve chamber, or the like) in response to electrical input provided by the one or more controller(s) 110. In some embodiments, each of the valves 1778, 1780 may be embodied as, or otherwise includes, a two-position, three-way solenoid valve. The valves 1778, 1780 includes respective solenoids 1784, 1786 that are configured to actuate the valves 1778, 1780.

A first output 1788 of the pump 1776 is fluidly coupled to the valve 1778, whereas a second output 1790 of the pump 1776 is fluidly coupled to the valve 1780. The valve 1778 is fluidly coupled to the reservoir 1774 and to a port 1792 of the actuator 1724, and the valve 1780 is fluidly coupled to the reservoir 1774 and to a port 1794 of the actuator 1724. When the valve 1778 is in a supply position and the pump 1776 is in the supply mode, the pump 1776 is fluidly coupled to the port 1792 through the valve 1778 to supply fluid to the port 1792. Conversely, when the valve 1778 is in a dump position, the port 1792 is fluidly coupled to the reservoir 1774 through the valve 1778 to provide fluid to the reservoir 1774. When the valve 1780 is in a supply position and the pump 1776 is in the supply mode, the pump 1776 is fluidly coupled to the port 1794 through the valve 1780 to supply fluid to the port 1794. Conversely, when the valve 1780 is in a dump position, the port 1794 is fluidly coupled to the reservoir 1774 through the valve 1780 to provide fluid to the reservoir 1774.

In the illustrative embodiment, when the harvesting machine 100 is in the operating mode 1810, fluid pressurized by the pump 1776 in the supply mode is alternatively provided to the ports 1792, 1794 through the corresponding valves 1778, 1780 to cause movement of the actuator 1724 between the retracted and extended positions 1850, 2052. When the harvesting machine 100 is in the operating mode 2112, fluid is not provided to the ports 1792, 1794 through the valves 1778, 1780 to cause movement of the actuator 1724. In the operating mode 2112, the pump 1776 may be in the neutral position and the valves 1778, 1780 may be in the dump position.

In one embodiment, the harvesting machine 100 includes the main frame 200, a drive mechanism (e.g., the drive unit 124 and/or the PTO shaft, flywheel, transmission) that includes the crank arm 1718, the plunger 1720, a linkage system that is embodied as, or otherwise includes, the connecting link 1732 and the rocker arm 1730, and a link that is embodied as, or otherwise includes, the actuator 1724. The drive mechanism is coupled to the main frame 200 and the linkage system couples the plunger 1720 to the main frame 200 (e.g., through the coupler 1734). The actuator 1724 couples the linkage system to the crank arm 218. The position of the plunger 1720 along the longitudinal axis LA is controlled at least in part by the linkage system. The position of the linkage system is controlled by at least one of a position of the crank arm 1718 about the crank arm axis CA" and a length of the actuator 1724.

Figure 19:
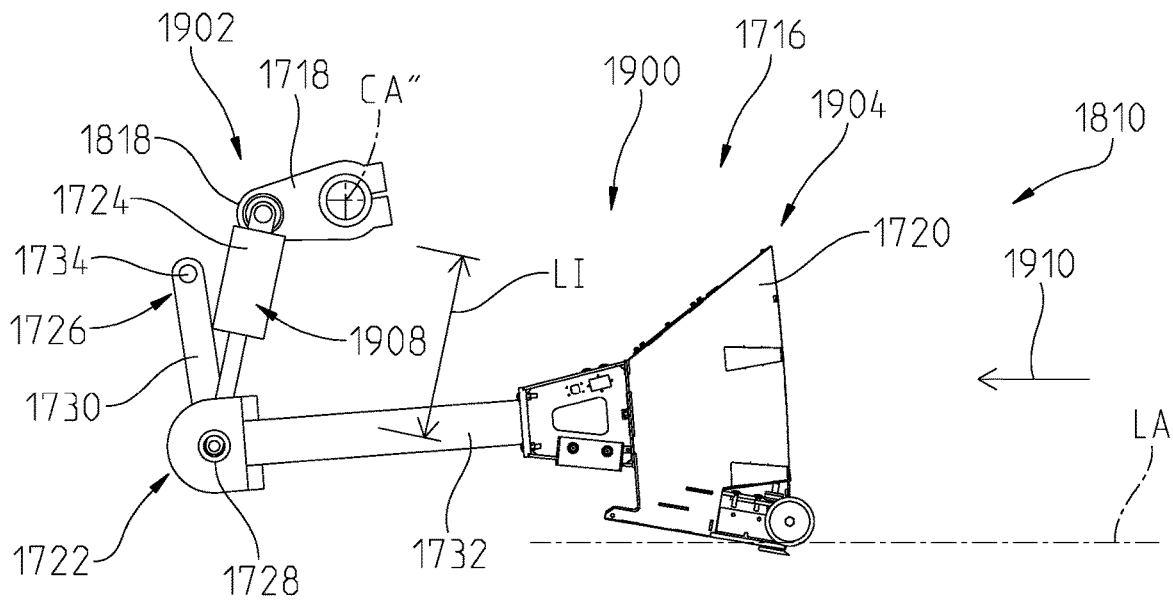
FIG. 19 is a side view of the compression system in another state during the operational mode depicted in FIG. 18.
Figure 20:
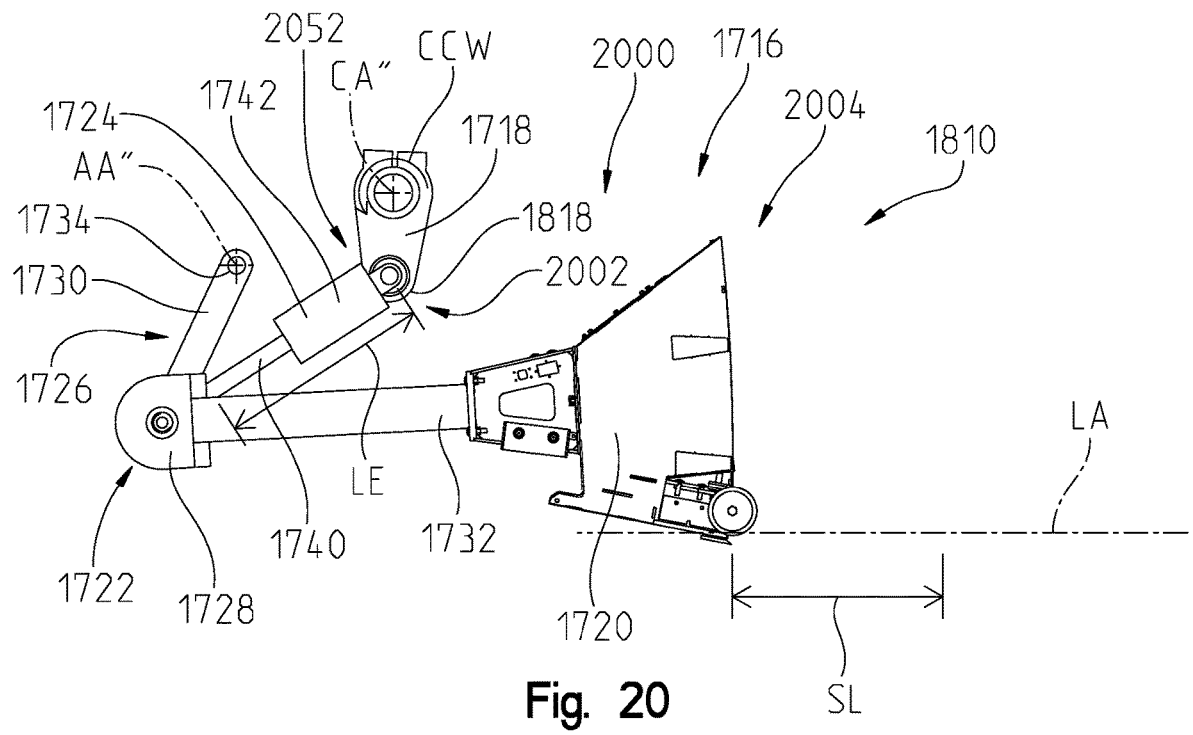
FIG. 20 is a side view of the compression system in yet another state during the operational mode depicted in FIG. 18.
Figure 21:
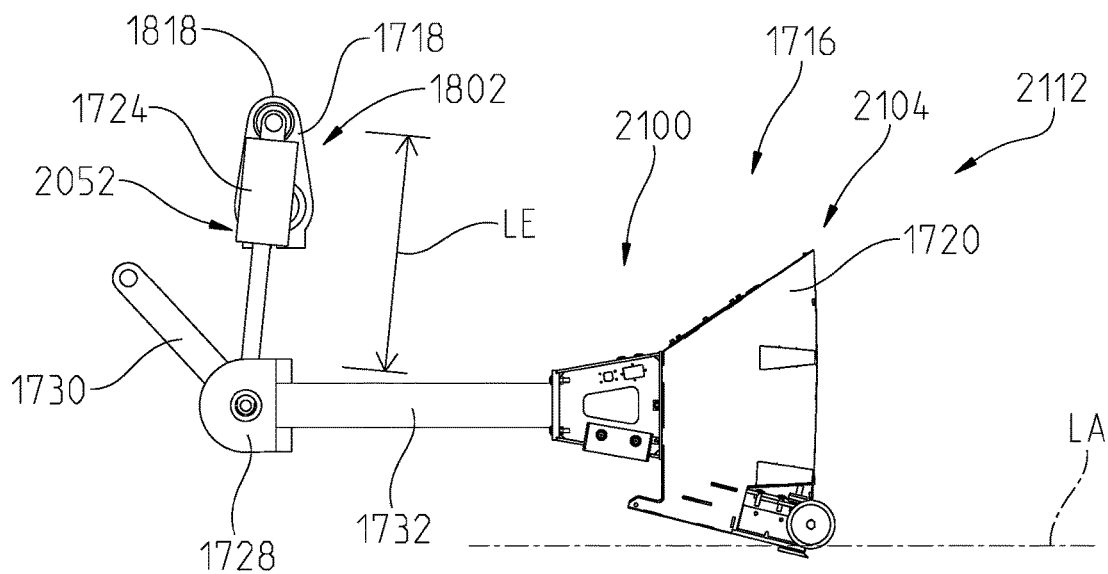
FIG. 21 is a side view of the compression system of FIG. 17 in one state during another operational mode of the harvesting machine, in which rotation of the crank arm about the crank arm axis is de-coupled, and/or de-synchronized, from reciprocal movement of the plunger along the longitudinal axis.
Figure 22:
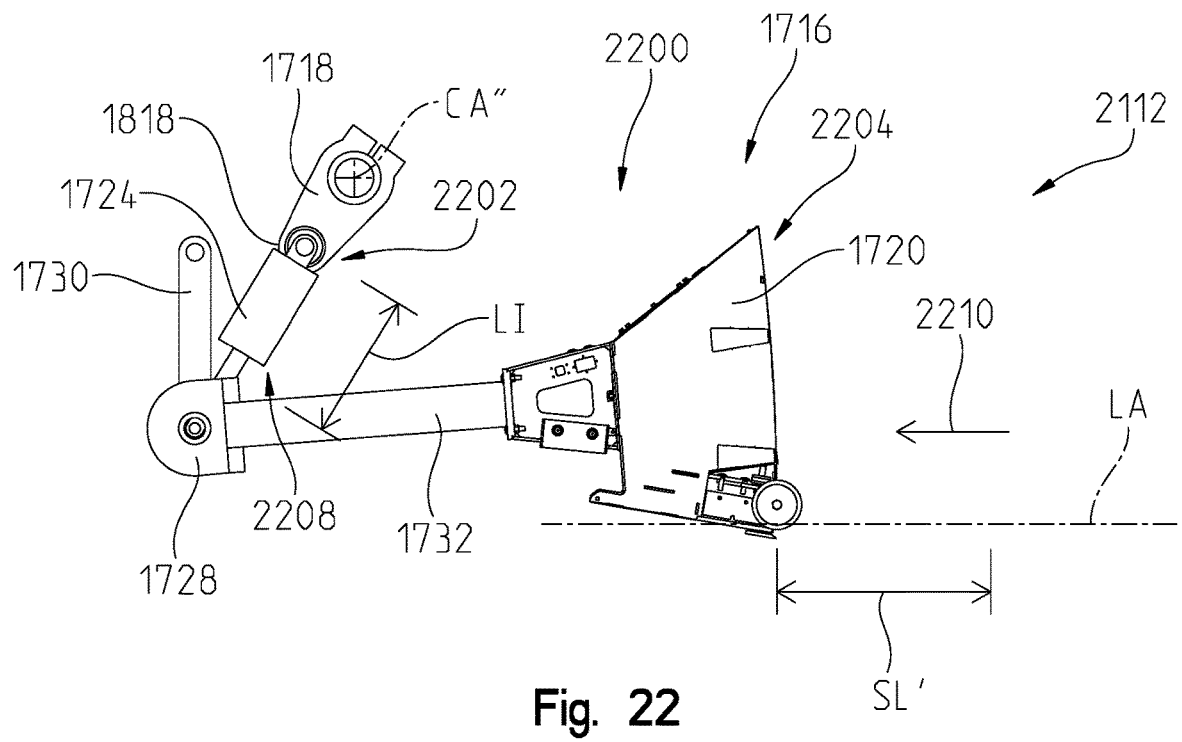
FIG. 22 is a side view of the compression system in another state during the operational mode depicted in FIG. 21.
Figure 23:
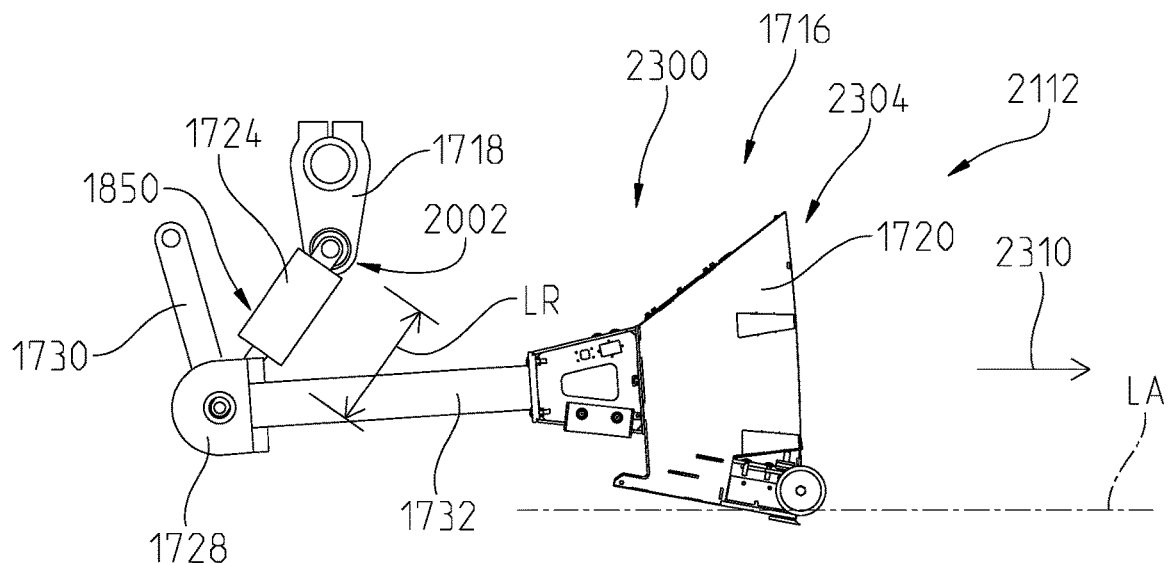
FIG. 23 is a side view of the compression system in yet another state during the operational mode depicted in FIG. 21.

Referring now to FIGS. 18-23, operation of the compression system 1716 is depicted in various states when the harvesting machine 100 is in the operating mode 1810 (see FIGS. 18-20), and when the harvesting machine 100 is in the operating mode 2112 (see FIGS. 21-23). Each of the various states occurs during a single operational cycle, which corresponds to, or is otherwise associated with, 360 degrees of crank arm 1718 rotation about the crank arm axis CA" in the counterclockwise direction CCW. Of course, it should be appreciated that in other configurations of the compression system 1716, a single cycle may be characterized by clockwise rotation about the axis CA". In any case, the crank arms 1718, 1718' and the drive assemblies 1722, 1722' move together in use of the system 1716, as indicated above. For the purposes of simplicity, the description below (i.e., the description referring to FIGS. 18-29) includes an operational discussion of the crank arm 1718 and the drive assembly 1722 and omits references to the corresponding features 1718', 1722'. That being said, it should be understood that throughout each operational cycle, each crank arm 1718 and the rocker arm 1730 of each drive assembly 1722 rotate about respective axes CA", AA" and are constrained against linear translation. Moreover, throughout each operational cycle, it should be understood that the coupling hub 1728 of each drive assembly 1722 is configured for translation.

Figure 18:
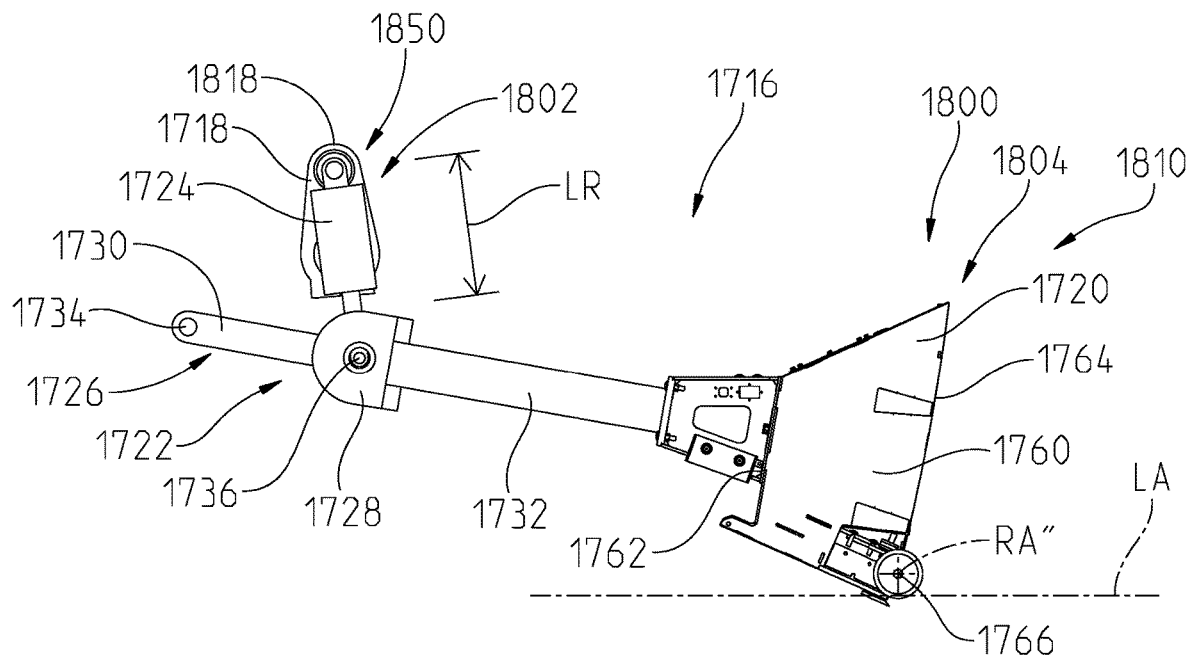
FIG. 18 is a side view of the compression system of FIG. 17 in one state during a one operational mode of the harvesting machine, in which rotation of a crank arm of the compression system about a crank arm axis is coupled, and/or synchronized, with reciprocal movement of a plunger of the compression system along a longitudinal axis.

Throughout the operating mode 1810 of the harvesting machine 100 depicted in FIGS. 18-20, rotation of the crank arm 1718 and movement of the plunger 1720 are coupled together and/or synchronized, as indicated above. Rotation of the crank arm 1718 and movement of the plunger 1720 throughout the operating mode 1810 may therefore be said to be in-phase. Rotation of the crank arm 1718 in-phase with movement of the plunger 1720 during the mode 1810 corresponds to, is associated with, or otherwise dictates the positional relationships between the crank arm 1718 and the actuator 1724 discussed below.

In the operational state 1800 of the compression system 1716 depicted in FIG. 18, an end 1818 of the crank arm 1718 is oriented in an upwardly-pointing, top dead center (TDC) orientation 1802. The orientation 1802 may correspond to, or otherwise be associated with, a 12 o'clock orientation of the crank arm 1718 relative to the crank arm axis CA". When the end 1818 is in the TDC orientation 1802, the actuator 1724 is in the retracted position 1850 such that the actuator 1724 has a length LR. Additionally, when the end 1818 is in the TDC orientation 1802 and the actuator 1724 is in the retracted position 1850, the plunger 1720 is in a rearmost position 1804 in the compression chamber 226.

Subsequent to counterclockwise rotation of the crank arm 1718 about the crank arm axis CA" and extension of the actuator 1724, the plunger 1720 moves in the direction indicated by the arrow 1910 along the longitudinal axis LA such that the compression system 1716 is in the operational state 1900 depicted in FIG. 19. In the state 1900, the end 1818 of the crank arm 1718 is oriented in an orientation 1902 that is between the 12 o'clock and 6 o'clock orientations relative to the axis CA". When the end 1818 is in the orientation 1902, the actuator 1724 is in an intermediate position 1908 between the retracted and extended positions 1850, 2052 such that the actuator 1724 has a length LI that is greater than the length LR. Additionally, when the end 1818 is in the orientation 1902 and the actuator 1724 is in the position 1908, the plunger 1720 is in a position 1904 in the compression chamber 226 that is located forward of the rearmost position 1804.

Following further counterclockwise rotation of the crank arm 1718 about the crank arm axis CA" and further extension of the actuator 1724, the plunger 1720 moves in the direction indicated by the arrow 1910 along the longitudinal axis LA such that the compression system 1716 is in the operational state 2000 depicted in FIG. 20. In the state 2000, the end 1818 of the crank arm 1718 is oriented in a downwardly-pointing, bottom dead center (BDC) orientation 2002. The orientation 2002 may correspond to, or otherwise be associated with, a 6 o'clock orientation of the crank arm 1718 relative to the crank arm axis CA". When the end 1818 is in the BDC orientation 2002, the actuator 1724 is in the extended position 2052 such that the actuator 1724 has a length LE that is greater than the length LI. Additionally, when the end 1818 is in the BDC orientation 2002 and the actuator 1724 is in the extended position 2052, the plunger 1720 is in a forwardmost position 2004 in the compression chamber 226.

Of course, it should be appreciated that subsequent to reaching the operational state 2000, further counterclockwise rotation still of the crank arm 1718 about the crank arm axis CA" and retraction of the actuator 1724 are associated with movement of the plunger 1720 along the longitudinal axis LA from the forwardmost position 2004 to the rearmost position 1804. That said, a stroke length SL of the plunger 1720 along the longitudinal axis LA is substantially defined by movement of the plunger 1720 from the rearmost position 1804 to the forwardmost position 2004 (or vice versa). Compared to the stroke length of the plunger 1720 during the operating mode 2112 of the harvesting machine 100 in which rotation of the crank arm 1718 and movement of the plunger 1720 are said to be out-of-phase, as further discussed below, the in-phase stroke length SL may correspond to greater, movement of the plunger 1720 along the axis LA. That said, when the plunger 1720 moves or strokes over the in-phase stroke length SL, the plunger 1720 is capable of deforming, compressing, compacting, and/or densifying crop material 106 during the runtime operating mode 1810 of the harvesting machine 100.

Throughout the operating mode 2112 of the harvesting machine 100 depicted in FIGS. 21-23, rotation of the crank arm 1718 and movement of the plunger 1720 are de-coupled and/or de-synchronized from one another, as indicated above. Rotation of the crank arm 1718 and movement of the plunger 1720 throughout the operating mode 2112 may therefore be said to be out-of-phase. Rotation of the crank arm 1718 out-of-phase with movement of the plunger 1720 during the mode 2112 corresponds to, is associated with, or otherwise dictates the positional relationships between the crank arm 1718 and the actuator 1724 discussed below.

It should be appreciated that when the compression system 1716 is in the operating mode 2112 as depicted in FIGS. 21-23, the length of the actuator 1724 may not be varied and/or controlled by the controller 110 in cooperation with the control system 1770. Put another way, when the compression system 1716 is in the operating mode 2112, fluid may not be provided to the ports 1792, 1794 through the corresponding valves 1778, 1780 to cause movement of the actuator 1724 between the retracted and extended positions 1850, 2052. Rather, variation of the length of the actuator 1724 may be a function of the distance between the end 1818 of the crank arm 1718 and the coupling hub 1728.

In the operational state 2100 of the compression system 1716 depicted in FIG. 21, the end 1818 of the crank arm 1718 is oriented in the TDC orientation 1802. When the end 1818 is in the TDC orientation 1802, the actuator 1724 is in the extended position 2052 such that the actuator 1724 has the length LE. Additionally, when the end 1818 is in the TDC orientation 1802 and the actuator 1724 is in the extended position 2052, the plunger 1720 is in a rearmost position 2104 in the compression chamber 226.

Subsequent to counterclockwise rotation of the crank arm 1718 about the crank arm axis CA", the plunger 1720 moves in the direction indicated by the arrow 2210 along the longitudinal axis LA such that the compression system 1716 is in the operational state 2200 depicted in FIG. 22. In the state 2200, the end 1818 of the crank arm 1718 is oriented in an orientation 2202 that is between the 12 o'clock and 6 o'clock orientations relative to the axis CA". When the end 1818 is in the orientation 2202, the actuator 1724 is in an intermediate position 2208 between the retracted and extended positions 1850, 2052 such that the actuator 1724 has the length LI. Additionally, when the end 1818 is in the orientation 2202 and the actuator 1724 is in the position 2208, the plunger 1720 is in a forwardmost position 2204 in the compression chamber 226.

A stroke length SL' of the plunger 1720 along the longitudinal axis LA when the compression system 1716 is in the operating mode 2112 is substantially defined by movement of thereof from the rearmost position 2104 to the forwardmost position 2204 (or vice versa). In some embodiments, as indicated above, the stroke length SL' may be less than the stroke length SL. Additionally, in some embodiments, when the plunger 1720 moves or strokes over the out-of-phase stroke length SL', the plunger 1720 may be capable of deforming, compressing, compacting, and/or densifying crop material 106 during the runtime operating mode 1810 of the harvesting machine 100 to a somewhat limited degree.

Following further counterclockwise rotation of the crank arm 1718 about the crank arm axis CA", the plunger 1720 moves in the direction indicated by the arrow 2310 rearward along the longitudinal axis LA such that the compression system 1716 is in the operational state 2300 depicted in FIG. 23. In the state 2300, the end 1818 of the crank arm 1718 is oriented in the BDC orientation 2002. When the end 1818 is in the BDC orientation 2002, the actuator 1724 is in the retracted position 1850 such that the actuator 1724 has the length LR. Additionally, when the end 1818 is in the BDC orientation 2002 and the actuator 1724 is in the retracted position 1850, the plunger 1720 is in a position 2304 in the compression chamber 226 between positions 2104, 2204.

Figure 24:
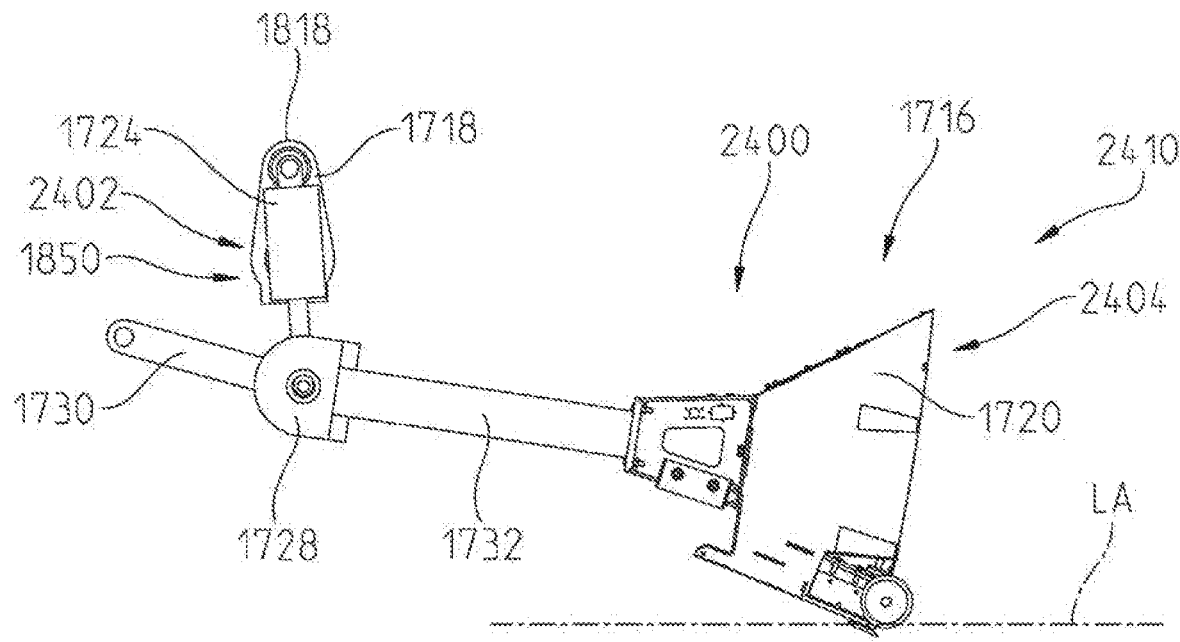
FIG. 24 is a side view of the compression system of FIG. 17 in one state during yet another operational mode of the harvesting machine such that movement of the actuator is permitted independently of rotation of the crank arm about the crank arm axis.
Figure 25:
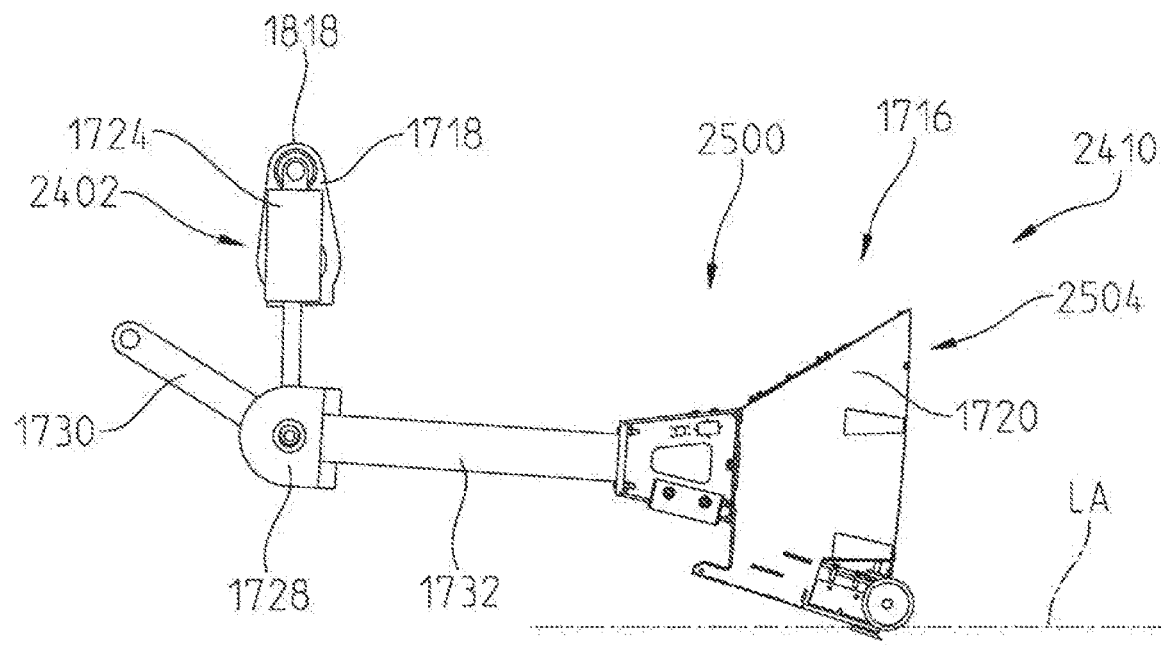
FIG. 25 is a side view of the compression system in another state during the operational mode depicted in FIG. 24.
Figure 26:
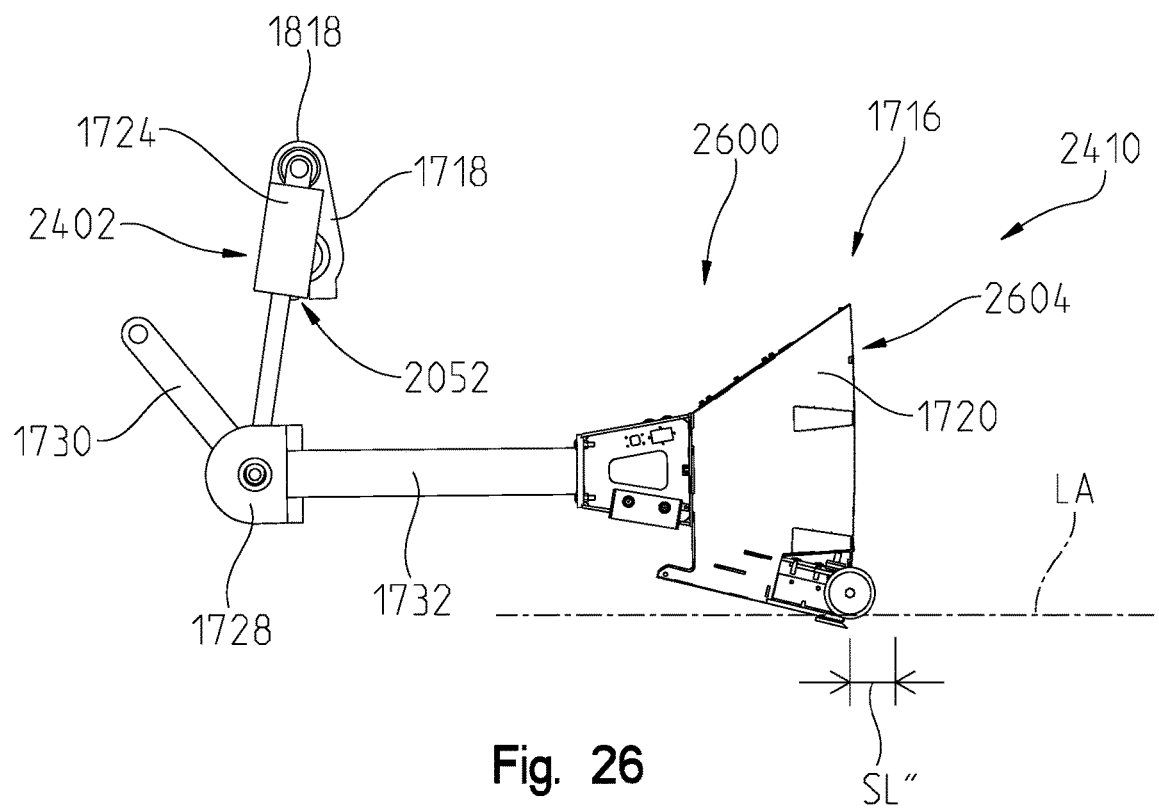
FIG. 26 is a side view of the compression system in yet another state during the operational mode depicted in FIG. 24.

Referring now to FIGS. 24-26, the compression system 1716 of the harvesting machine 100 is shown in various states during an operating mode 2410. Throughout the illustrative mode 2410, rotation of the crank arm 1718 and movement of the plunger 1720 are de-coupled and/or de-synchronized from one another. Thus, in some embodiments, the mode 2410 may be similar to, associated with, or otherwise included in the operating mode 2112.

As depicted in FIGS. 24-26, movement of the plunger 1720 along the longitudinal axis LA in the operating mode 2410 is associated with, and/or caused substantially entirely by, movement of the actuator 1724 between the retracted and extended positions 1850, 2052. Movement of the plunger 1720 in the operating mode 2410 therefore occurs substantially without, and is independent of, rotation of the crank arm 1718. Indeed, in each of the states of the compression system 1716 depicted in FIGS. 24-26, the end 1818 of the crank arm 1718 is depicted in a top dead center (i.e., 12 o'clock) orientation 2402. The description of the operating mode 2410 below accordingly omits discussion of rotation of the crank arm 1718.

In the operational state 2400 of the compression system 1716 depicted in FIG. 24, the actuator 1724 is in the retracted position 1850 and the plunger 1720 is in a position 2404 in the compression chamber 226. Subsequent to extension of the actuator 1724, the actuator 1724 is in a position 2508 between the retracted and extended positions 1850, 2052, and the plunger 1720 is in a position 2504 in the chamber 226 in the operational state 2500 of the compression system 1716 depicted in FIG. 25. Following further extension of the actuator 1724, the actuator 1724 is in the extended position 2052 and the plunger 1720 is in a position 2604 in the chamber 226 in the operational state 2600 of the compression system 1716 depicted in FIG. 26.

A stroke length SL" of the plunger 1720 along the longitudinal axis LA when the compression system 1716 is in the operating mode 2410 is substantially defined by movement thereof from the position 2404 to the position 2604. In some embodiments, the stroke length SL" may be less than the stroke length SL' and the stroke length SL. Additionally, in some embodiments, the stroke length SL" may have a small or nominal value. In such embodiments, when the plunger 1720 moves or strokes over the stroke length SL", the plunger 1720 may be capable of deforming, compressing, compacting, and/or densifying crop material 106 during the operating mode 2410 of the harvesting machine 100 to a limited and/or nominal degree.

Figure 27:
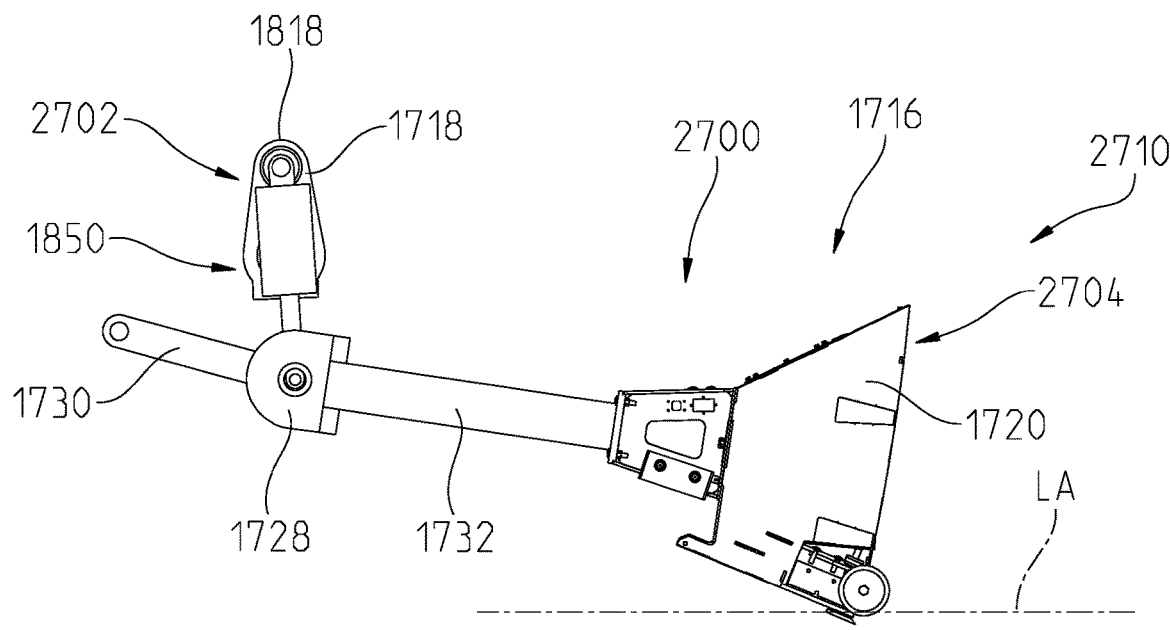
FIG. 27 is a side view of the compression system of FIG. 17 in one state during yet another operational mode still of the harvesting machine such that rotation of the crank arm about the crank arm axis is permitted independently of movement of the actuator.
Figure 28:
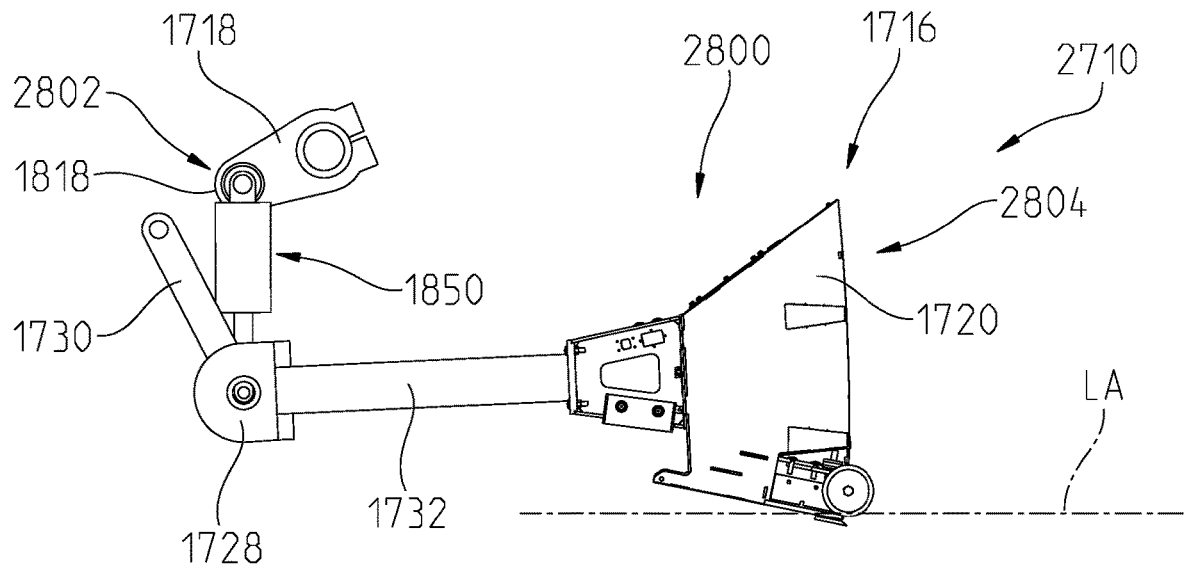
FIG. 28 is a side view of the compression system in another state during the operational mode depicted in FIG. 27.
Figure 29:
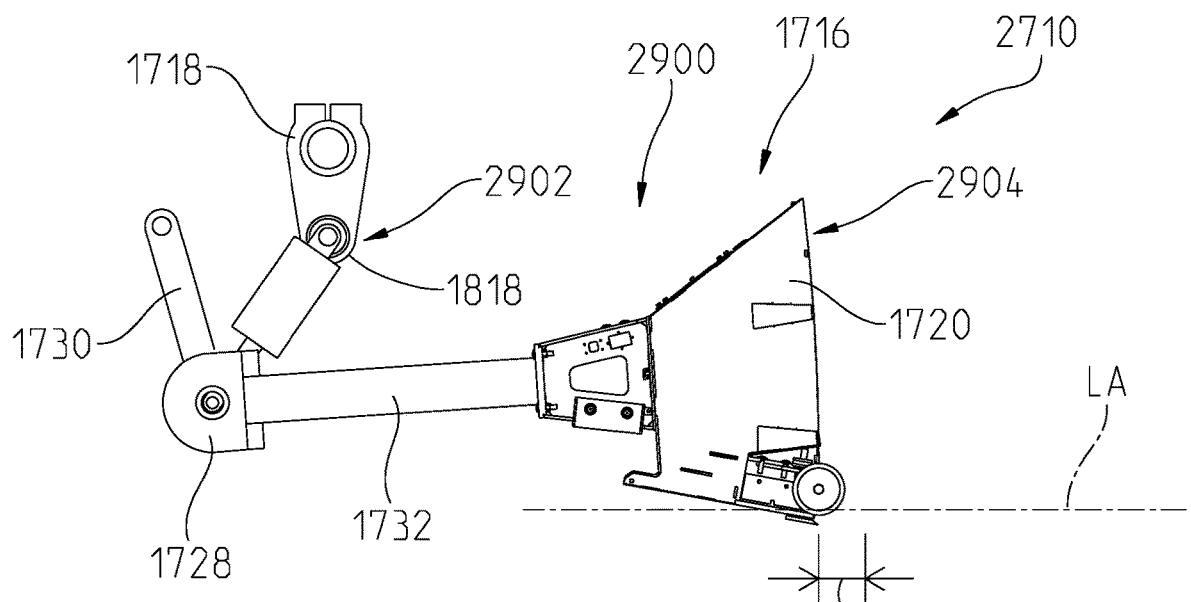
FIG. 29 is a side view of the compression system in yet another operational state during the operational mode depicted in FIG. 27.

Referring now to FIGS. 27-29, the compression system 1716 of the harvesting machine 100 is shown in various states during an operating mode 2710. Throughout the illustrative mode 2710, rotation of the crank arm 1718 and movement of the plunger 1720 are de-coupled and/or de-synchronized from one another. Thus, in some embodiments, the mode 2710 may be similar to, associated with, or otherwise included in the operating mode 2112.

As depicted in FIGS. 27-29, movement of the plunger 1720 along the longitudinal axis LA in the operating mode 2710 is associated with, and/or caused substantially entirely by, rotation of the crank arm 1718 about the crank arm axis CA". Movement of the plunger 1720 in the operating mode 2710 therefore occurs substantially without, and is independent of, movement of the actuator 1724 between the retracted and extended positions 1850, 2052. Indeed, in each of the states of the compression system 1716 depicted in FIGS. 27-29, the actuator 1724 is depicted in the retracted position 1850. The description of the operating mode 2710 below accordingly omits discussion of movement of the actuator 1724.

In the operational state 2700 of the compression system 1716 depicted in FIG. 27, the end 1818 of the crank arm 1718 is in a top dead center (i.e., 12 o'clock) orientation 2702 and the plunger 1720 is in a position 2704 in the compression chamber 226. Subsequent to counterclockwise rotation of the crank arm 1718 about the crank arm axis CA", the end 1818 is in an orientation 2802 between the 12 and 6 o'clock orientations, and the plunger 1720 is in a position 2804 in the chamber 226 in the operational state 2800 of the compression system 1716 depicted in FIG. 28. Following further counterclockwise rotation of the crank arm 1718 about the crank arm axis CA", the end 1818 is in a bottom dead center (i.e., 6 o'clock) orientation 2902 and the plunger 1720 is in a position 2904 in the chamber 226 in the operational state 2900 of the compression system 1716 depicted in FIG. 29.

A stroke length SL'" of the plunger 1720 along the longitudinal axis LA when the compression system 1716 is in the operating mode 2910 is substantially defined by movement thereof from the position 2704 to the position 2904. In some embodiments, the stroke length SL'" may be less than the stroke length SL' and the stroke length SL. Additionally, in some embodiments, the stroke length SL'" may have a small or nominal value. In such embodiments, when the plunger 1720 moves or strokes over the stroke length SL'", the plunger 1720 may be capable of deforming, compressing, compacting, and/or densifying crop material 106 during the operating mode 2910 of the harvesting machine 100 to a limited and/or nominal degree.

Figure 30:
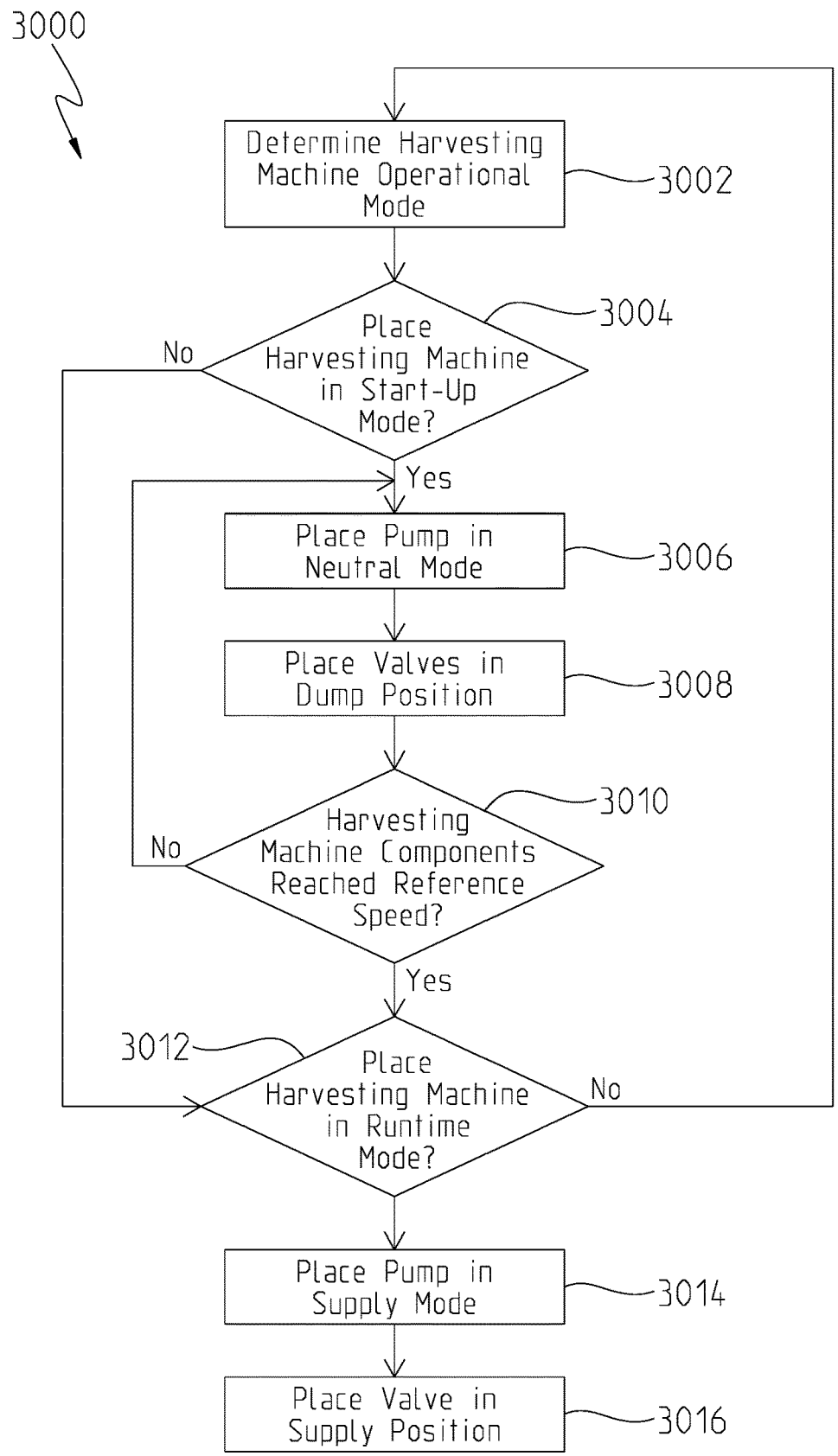
FIG. 30 is a simplified block diagram of a method of operating the harvesting machine of FIG. 1.

Referring now to FIG. 30, an illustrative method 3000 of operating the harvesting machine 100 is shown. The method 3000 may include, or otherwise be embodied as, a set of instructions that are stored in the memory 1715 and executable by the processor 1713 of the one or more controller(s) 110. It should be appreciated that the method 3000 may be performed by the one or more controller(s) 110 to control operation of the compression system 1716 of the harvesting machine 100. More specifically, the method 3000 may be performed by the one or more controller(s) 110 to control operation of the compression system 1716 and the electro-hydraulic control system 1770 in the operating modes 1810, 2112, 2410, 2710, as well as changes and/or transitions between those modes and/or other operating modes of the machine 100. Furthermore, it should be appreciated that the method 3000 may be performed in a number of sequences other than the illustrative sequence to control operation of the machine 100, and that the method 3000 may include activities other than, and/or in addition to, those depicted in FIG. 30.

The method 3000 begins with block 3002 in which a determination regarding the current operational mode of the harvesting machine 100 is made. To perform block 3002, in some embodiments, the controller(s) 110 may process input data provided to the controller(s) 110 by one or more input devices, such as a shift selector and/or sensors configured to provide data indicative of the current operational state of the machine 100, for example. In any case, from the block 3002, the method 3000 subsequently proceeds to block 3004, In block 3004, the controller(s) 110 determine whether to place the harvesting machine 100 in a start-up mode. In the illustrative embodiment, and as indicated above, the start-up mode is associated with, or otherwise corresponds to, an operating mode in which components of the machine 100 (e.g., the PTO shaft, the flywheel, the transmission, and/or the crank arm 1718) may be initially operated until the components reach a reference or predetermined speed associated with runtime operation of the machine 100. For the purposes of the present disclosure, the start-up mode is associated with the operating mode 2112 in which rotation of the crank arms 1718, 1718' is de-coupled and/or desynchronized from movement of the plunger 1720. In some embodiments, the start-up mode may be associated with the operating mode 2410. Additionally, in some embodiments, the start-up mode may be associated with the operating mode 2710. In any case, to perform block 3004, in some embodiments, the controller(s) 110 may process input data provided thereto by one or more input devices, such as sensors configured to provide data indicative of the rotational speed of the PTO shaft and/or the crank arms 1718, 1718', for example. If it is determined in block 3004 that the machine 100 should be placed in the start-up mode, the method 3000 subsequently advances to block 3006.

In block 3006, the controller(s) 110 place the pump 1776 in the neutral mode. To do so, the controller(s) 110 may direct a controller included in, or otherwise associated with, the pump 1776 to place the pump 1776 in the neutral mode. In some embodiments, the pump 1776 does not supply pressurized fluid to other components of the circuit 1772 when operated in the neutral mode, as indicated above.

From the block 3006, the method 3000 illustratively proceeds to block 3008. In block 3008, the controller(s) 110 places the valves 1778, 1780 in the dump position. In some embodiments, the controller(s) 110 may provide electrical input to the solenoids 1784, 1786 to place the valves 1778, 1780 in the dump position such that the ports 1792, 1794 are fluidly coupled to the reservoir 1774 through the valves 1778, 1780. In any case, following block 3008, the method 3000 proceeds to block 3010.

In block 3010, the controller(s) 110 determine whether components of the machine 100 (e.g., the PTO shaft, the flywheel, the transmission, and/or the crank arm 1718) have reached the reference or predetermined speed associated with the runtime operational mode of the harvesting machine 100. If it is determined in block 3010 that the components have reached the reference speed, the method 3000 proceeds to block 3012.

In block 3012, the controller(s) 110 determine whether to place the harvesting machine 100 in the runtime operational mode. In the illustrative embodiment, and as indicated above, the runtime operational mode corresponds to, or is otherwise associated with, an operational mode in which rotation of the crank arms 1718, 1718' is coupled to, and/or synchronized with, movement of the plunger 1720. Therefore, for the purposes of the present disclosure, the runtime operational mode is associated with the operating mode 1810. In any case, to perform block 3012, in some embodiments, the controller(s) 110 may process input data provided thereto by one or more input devices, such as sensors configured to provide data indicative of the rotational speed of the PTO shaft and/or the crank arms 1718, 1718', for example. If it is determined in block 3012 that the machine 100 should be placed in the runtime mode, the method 3000 subsequently advances to block 3014.

In block 3014, the controller(s) 110 place the pump 1776 in the supply mode. To do so, the controller(s) 110 may direct a controller included in, or otherwise associated with, the pump 1776 to place the pump 1776 in the supply mode. In the supply mode, the pump 1776 supplies pressurized fluid to other components of the circuit 1772 (e.g., the valves 1778, 1780), as indicated above.

From the block 3014, the method 3000 illustratively proceeds to block 3016. In block 3016, the controller(s) 110 places the valves 1778, 1780 in the supply position. In some embodiments, the controller(s) 110 may provide electrical input to the solenoids 1784, 1786 to place the valves 1778, 1780 in the supply position such that the ports 1792, 1794 are alternately fluidly coupled to the respective pump outlets 1788, 1790 through the valves 1778, 1780 to cause movement of the actuators 1724, 1724' between the retracted and extended positions 1850 and 2052. In some embodiments, one iteration of the method 3000 may conclude following completion of block 3016.

Returning to block 3012, if it is determined in block 3012 that the harvesting machine 100 should not be placed in the runtime mode, the method 3000 returns to block 3002. In some embodiments, after returning to the block 3002, another iteration of the method 3000 may be performed.

Returning to block 3010, if it is determined in block 3010 that the components of the harvesting machine 100 have not reached the reference speed, the method 3000 returns to block 3006. Thus, if it is determined in block 3010 that the components of the harvesting machine 100 have not reached the reference speed, operation of the machine 100 in the start-up mode may continue.

Returning to block 3004, if it is determined in block 3004 that the harvesting machine 100 should not be placed in the start-up mode, the method 3000 advances to block 3012. As such, in the illustrative method 3000, operation of the harvesting machine 100 is associated with operation thereof in either the start-up mode or the runtime mode.

While a large square baler is depicted in FIG. 1, the present disclosure is not limited to large square balers, but includes round balers such as those found in U.S. Pat. Nos. 6,622,468, 6,640,699, and 7,694,504, the disclosures of which are incorporated by reference herein. The round baler does not include a compression chamber as does the large square baler. The present disclosure, however, in not limited to a baler of a particular type, and is applicable to balers of different types including those having a precompression chamber, no precompression chamber, secondary rotors, or those having crop moving directly into a formation chamber. The present disclosure is also not limited to balers but can also include other harvesting machines or crop processing machines such as chopping systems used on combines.

While embodiments incorporating the principles of the present disclosure have been disclosed hereinabove, the present disclosure is not limited to the disclosed embodiments. For instance, crop harvesting system employing a precutter type feed system including round balers (of all size and chamber types), square balers (of all sizes), and feeder wagons can be configured to incorporate the present disclosure. Also, any crop handling system which includes chopper systems for grain harvesting equipment, for example a combine chopper system, can employ the present disclosure. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A harvesting machine, comprising:
a main frame;
a drive mechanism coupled to the main frame, the drive mechanism having at least one crank arm that is rotatable about a crank arm axis;
a plunger movable along a longitudinal axis in a compression chamber between a de-stroked position and a stroked position that is located rearward of the de-stroked position along the longitudinal axis;
a linkage system that couples the plunger to the main frame, wherein the linkage system includes a first linkage having a first rocker arm pivotally coupled to the main frame at one end thereof and pivotally coupled to a first connecting link at another end thereof arranged opposite the one end, wherein the first connecting link directly contacts the plunger, wherein the first rocker arm is separate from the at least one crank arm and extends from the main frame to the first connecting link, and wherein the first rocker arm has a fixed length; and
at least one link that couples the linkage system to the at least one crank arm,
wherein a position of the plunger along the longitudinal axis is controlled at least in part by the linkage system, and wherein a position of the linkage system is controlled by at least one of a position of the at least one crank arm about the crank arm axis and a length of the at least one link,
wherein the linkage system includes a second linkage having a second rocker arm pivotally coupled to the main frame at one end thereof and pivotally coupled to a second connecting link at another end thereof arranged opposite the one end, wherein the second connecting link directly contacts the plunger, wherein the second rocker arm is separate from the at least one crank arm and extends from the main frame to the second connecting link, and wherein the second rocker arm has a fixed length, and wherein the first and second rocker arms are spaced apart from one another and arranged to extend parallel to one another from the main frame to the corresponding first and second connecting links.

2. The harvesting machine of claim 1, wherein the at least one link has a fixed length such that the position of the linkage system is controlled by the position of the at least one crank arm about the crank arm axis.

3. The harvesting machine of claim 2, wherein the at least one link is pivotally coupled to the at least one crank arm and to at least one of the first rocker arm and the first connecting link of the first linkage.

4. The harvesting machine of claim 1 wherein the at least one link includes a first link and a second link, and wherein the at least one crank arm includes a first crank arm and a second crank arm.

5. The harvesting machine of claim 4, wherein the first link is pivotally coupled to the first crank arm and to each of the first rocker arm and the first connecting link of the first linkage, and wherein the second link is pivotally coupled to the second crank arm and to each of the second rocker arm and the second connecting link of the second linkage.

6. The harvesting machine of claim 1, wherein the at least one link includes a first actuator having a variable length, and wherein the position of the linkage system is controlled by the position of the at least one crank arm about the crank arm axis and the variable length of the first actuator.

7. The harvesting machine of claim 6, wherein the at least one link is pivotally coupled to the at least one crank arm and to at least one of the first rocker arm and the first connecting link of the first linkage.

8. The harvesting machine of claim 7, wherein the at least one link includes a second actuator having a variable length, and wherein the position of the linkage system is controlled by the position of the at least one crank arm about the crank arm axis and the variable length of the second actuator.

9. The harvesting machine of claim 8, wherein the at least one crank arm includes a first crank arm and a second crank arm, the first actuator is pivotally coupled to the first crank arm and to each of the first rocker arm and the first connecting link of the first linkage, and the second actuator is pivotally coupled to the second crank arm and to each of the second rocker arm and the second connecting link of the second linkage.

10. The harvesting machine of claim 1, wherein the linkage system does not include a component having a variable length.

11. A harvesting machine, comprising:
a main frame;
a drive mechanism coupled to the main frame, the drive mechanism having at least one crank arm that is rotatable about a crank arm axis;
a plunger movable along a longitudinal axis in a compression chamber between a de-stroked position and a stroked position that is located rearward of the de-stroked position along the longitudinal axis; and
a linkage system that couples the plunger to the main frame and is coupled to the at least one crank arm, wherein the linkage system includes a first linkage having a first control arm pivotally coupled to the main frame at one end thereof and pivotally coupled to a first connecting link at another end thereof arranged opposite the one end, wherein the first connecting link directly contacts the plunger, and wherein the first control arm includes a first slot that extends between the one end and the another end over at least half of an entire length of the first control arm, wherein a position of the plunger along the longitudinal axis is controlled at least in part by the linkage system, and wherein a position of the linkage system is controlled by a position of the at least one crank arm about the crank arm axis, wherein the linkage system includes a second linkage having a second control arm pivotally coupled to the main frame at one end thereof and pivotally coupled to a second connecting link at another end thereof arranged opposite the one end, wherein the second connecting link directly contacts the plunger, and wherein the second control arm includes a second slot that extends between the one end and the another end over at least half of an entire length of the second control arm, and wherein the first and second control arms are spaced apart from one another and arranged to extend parallel to one another from the main frame to the corresponding first and second connecting links.

12. The harvesting machine of claim 11, wherein the first linkage includes a first control coupler to couple the at least one crank arm to the first control arm, and wherein the first control coupler is movable in the first slot formed in the first control arm in response to rotation of the at least one crank arm about the crank arm axis.

13. The harvesting machine of claim 12, wherein the at least one crank arm includes a first crank arm and a second crank arm, the first crank arm is coupled to the first control arm of the first linkage by the first control coupler of the first linkage, and the second crank arm is coupled to the second control arm of the second linkage by a second control coupler of the second linkage.

14. The harvesting machine of claim 13, wherein the second control coupler is movable in the second slot formed in the second control arm in response to rotation of the second crank arm about the crank arm axis.

15. The harvesting machine of claim 11, wherein the linkage system does not include a component having a variable length.

16. The harvesting machine of claim 11, wherein each of the first and second control arms is a unitary structure formed to include the corresponding first or second slot.

17. A harvesting machine, comprising:
a main frame;
a drive mechanism coupled to the main frame, the drive mechanism having at least one crank arm that is rotatable about a crank arm axis;
a plunger movable along a longitudinal axis in a compression chamber between a de-stroked position and a stroked position that is located rearward of the de-stroked position along the longitudinal axis;
a linkage system that couples the plunger to the main frame, wherein the linkage system includes a first linkage having a first rocker arm pivotally coupled to the main frame at one end thereof and pivotally coupled to a first connecting link at another end thereof arranged opposite the one end, wherein the first connecting link directly contacts the plunger, wherein the first rocker arm is separate from the at least one crank arm and extends from the main frame to the first connecting link, and wherein the first rocker arm is not extendable or retractable; and at least one link that couples the linkage system to the at least one crank arm, the at least one link having a variable length, wherein a position of the plunger along the longitudinal axis is controlled at least in part by the linkage system, and wherein a position of the linkage system is controlled by a position of the at least one crank arm about the crank arm axis and the variable length of the at least one link, wherein the linkage system includes a second linkage having a second rocker arm pivotally coupled to the main frame at one end thereof and pivotally coupled to a second connecting link at another end thereof arranged opposite the one end, wherein the second connecting link directly contacts the plunger, wherein the second rocker arm is separate from the at least one crank arm and extends from the main frame to the second connecting link, and wherein the second rocker arm is not extendable or retractable, and wherein the first and second rocker arms are spaced apart from one another and arranged to extend parallel to one another from the main frame to the corresponding first and second connecting links.

18. The harvesting machine of claim 17, wherein the at least one link includes first and second actuators each having a variable length, and wherein the position of the linkage system is controlled by the position of the at least one crank arm about the crank arm axis and the variable lengths of the first and second actuators.

19. The harvesting machine of claim 18, wherein the at least one crank arm includes a first crank arm and a second crank arm, wherein the first actuator is pivotally coupled to the first crank arm and to each of the first rocker arm and the first connecting link of the first linkage, and wherein the second actuator is pivotally coupled to the second crank arm and to each of the second rocker arm and the second connecting link of the second linkage.

20. The harvesting machine of claim 17, wherein the first and second rocker arms extend from the main frame to the corresponding first and second connecting links without direct contact with a component of the linkage system having a variable length.

* * * * *